(12) United States Patent
Griffiths

(10) Patent No.: US 6,771,947 B1
(45) Date of Patent: Aug. 3, 2004

(54) METHOD AND SYSTEM FOR CALL ADMINISTRATION

(75) Inventor: Michael A. Griffiths, Duluth, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 277 days.

(21) Appl. No.: 09/879,500

(22) Filed: Jun. 12, 2001

(51) Int. Cl.[7] .......................... H04M 11/04; H04M 3/42
(52) U.S. Cl. ................................ 455/404.1; 379/207.02
(58) Field of Search ............................. 455/415, 404.1; 379/207.02

(56) References Cited

U.S. PATENT DOCUMENTS

| | | | |
|---|---|---|---|
| 5,797,092 A | * | 8/1998 | Cox et al. .................... 455/404 |
| 2002/0186827 A1 | * | 12/2002 | Griffiths ................ 379/207.02 |

OTHER PUBLICATIONS

Cvijan, Brock, Corr, Grieg, Kuras, Schick, "ISDN Computer Aided Telephony" IEEE Network vol. 5, Issue 1, Jan. 1991.*

* cited by examiner

*Primary Examiner*—William Cumming
(74) *Attorney, Agent, or Firm*—Cantor Colburn LLP

(57) ABSTRACT

A call administration service for processing incoming calls during service activation times. One embodiment permits a subscriber to provision the administration service using configuration files, which provide the capability to establish flexible scenarios for the allowance, denial and routing of incoming calls. The present invention automatically routes authorized incoming calls, and permits unauthorized incoming calls to be routed in accordance with a caller's interactive responses. An embodiment provides multiple methods for interacting with the system, including file and speech input of subscriber provisioning information, and speech input of caller interactive responses.

28 Claims, 12 Drawing Sheets

METHOD AND SYSTEM FOR CALL ADMINISTRATION

CROSS-REFERENCES TO RELATED APPLICATIONS

United States Utility Patent Application by M. A. Griffiths, filed on the same date as this application and entitled "Method and System for Implementing a Call Administration Service for a Public Switched Telephone Network", is hereby incorporated by reference.

FIELD OF INVENTION

The present invention relates generally to the field of communications. More particularly, the present invention relates to a system and method for implementing a call administration service.

BACKGROUND

There are many reasons for which a subscriber may want to prevent all calls to his telephone. For instance: the baby may be sleeping; a family member may be sick and resting; the subscriber has just returned home after working the night shift and wants to sleep; or, perhaps the wireless subscriber is about to enter the library or attend an important meeting at which the company CEO is the featured speaker. In each of these scenarios the ringing of the telephone is bothersome.

There are also situations in which a subscriber may want to deny calls from only certain types of callers. Such callers may include telemarketers and unknown callers. Additionally, a subscriber may want to keep the line available for a particular caller, like a son or daughter who is out later than expected. Furthermore, a wireless customer may desire to deny calls from out-of-area callers to avoid paying long-distance charges.

For many of the preceding scenarios, a common solution is to unplug the phone. Cutting off all communications is obviously not an optimal solution. First, the subscriber could not be reached in case of emergency. Additionally, the subscriber may have wanted to talk to some of those who attempted to call, but could not get through. Moreover, sometimes the subscriber remembers to plug the phone back in only after realizing why the subscriber has not received any calls for some time.

Automated techniques were established to overcome these problems and to address other scenarios, but they have various disadvantages. These techniques include Caller ID™, Caller ID Plus, Call Block, and Selective Call Block.

Caller ID™ and Caller ID Plus are often used by subscribers to screen calls. An incoming caller's number is displayed on the screen of a Caller ID™ device attached to the subscriber's telephone line. The subscriber can then chose to answer the phone or not. However, a caller can prevent or "block" the caller's number from displaying on the Caller ID™ device. With Caller ID Plus, the caller is forced to unblock the caller's number or the caller will not be connected to the subscriber's telephone.

One problem with using both Caller ID™ and Caller ID Plus in this manner is that the phone still rings. Another is that in many instances a caller's number will not display, such as when the call has been placed from out of the area or when the caller has blocked his telephone number from being displayed (and the subscriber has Caller ID™ rather than Caller ID Plus). In these cases, the subscriber must still answer the phone or let it ring until the caller hangs up.

Call Block is a service addressed in U.S. Pat. No. 5,060,255, issued October 1991 to Brown. Brown states in column 2 lines 62–65 that this "service and system arrangement will permit a customer to program a period of time where all incoming calls will be routed to an announcement." However, one problem with Call Block is that it simply blocks all calls. There is no capability for keeping the line available for access by certain callers, while blocking others.

U.S. Pat. No. 5,467,388, issued November 1995 to Redd, Jr. et al. (hereinafter Redd) addressed some of the shortcomings of Brown. Redd describes a "system for allowing a telephone subscriber to selectively block incoming calls for selected time periods," as stated in the abstract.

Additionally, Redd permits the automatic connection of an authorized caller as discussed in column 15 lines 55–60 which states that "from a caller's AIN or Caller ID™ number, the Integrated Service Control Point may determine whether the caller's number is on an authorized tier level. If the number is authorized, the call is terminated (i.e., connected) to the subscriber."

Furthermore, as stated in column 12 lines 39–41, Redd employs a programming method in which "DTMF is used, and hence the subscriber must have access to a Touch-Toner™ telephone." And, a DTMF entry method is described in column 12 lines 43–46 such that "the subscriber may select from a menu of items offering options how to program the service."

Although addressing some of the limitations of the "all or none" approach of Brown, Redd has several inadequacies. First of all, Redd does not provide for the flexibility of programming aperiodic activation periods. Additionally, Redd does not provide a capability to connect the caller to a device other than the subscriber's telephone. Furthermore, Redd's menu-driven, DTMF programming method is cumbersome, inflexible, and is limited to data entry via a Touch-Tone™ telephone.

U.S. Pat. No. 5,917,817, issued June 1999 to Dunn et al (hereinafter Dunn) addressed one shortcoming of Redd, i.e., that of DTMF programming. Dunn describes in column 5 lines 41–44 a system for programming user services "wherein a web server utilizes a database containing a forms based program to conduct its communications relative to browsers on customer computers." Dunn, however, requires a separate connection above and beyond the user's phone for programming of the user's services. A computer with a browser is also required.

What is needed is a call administration system that overcomes the shortcomings of conventional systems while providing additional advantages, such as flexibility.

SUMMARY

An embodiment of the present invention implements a call administration service, permitting both interactive and automatic denial and routing of calls, under the direction of subscriber provisioning. Embodiments of the present invention operate in a public switched telephone network environment, a cellular network environment, and other environments. Embodiments of the methods set forth herein are applicable to any communications environment in which a called party, subscriber, or other party desires to control the calls or communications sent to a called party.

An embodiment of the present invention provides for the provisioning and activating of a call administration service. Processing of an incoming call during 30 activation occurs in accordance with the subscriber provisioning. An incoming call is detected and a caller identification is extracted from the received incoming call information. Routing is performed according to the subscriber-provisioning information, and routing may take place interactively, requiring caller input, or automatically without I caller input. An embodiment of automatic routing comprises receiving an access table, validating that the caller identification exists within the access table and receiving an at least one primary auto-route option associated with the validated caller identification. The incoming call is then connected to an at least one subsystem identified by the at least one primary auto-route option. Subsystems comprise service provider systems (such as voice mail subsystems) and end user "systems" (such as home phones, cellular phones, BLUETOOTH communication devices, and PBXs).

Another embodiment of the present invention provides for alternate provisioning mechanisms for receiving and storing of subscriber provisioning information. Such alternate provisioning interface mechanisms comprise a DTMF menu, voice processing, speech processing, use of a browser form, and use of a formatted file translation mechanism. Voice and speech processing differ in that voice processing is specific to the speaker, whereas speech processing recognizes spoken words and is indifferent as to the actual speaker. Formatted file translation comprises reading a file, extracting certain data fields, and translating that data into a current configuration or storing that data in an at least one configuration file.

One embodiment of the present invention implements a browser form on a client device. Another embodiment comprises a cell phone as the client device.

The present invention includes an embodiment which provides for activation and configuration via a command, a script, a configuration file name or a pipeline with an optional at least one invocation (or starting) point and an optional at least one termination (or ending) point. An embodiment of a command comprises a single instruction. An embodiment of a script comprises multiple commands executed sequentially. An embodiment of a configuration file comprises a file comprising commands, scripts, other configuration files, invocation and termination points, and other configuration (or subscriber provisioning) information, such as access files (or access tables), journaling options, bypass options, and periodic/aperiodic activation dates and times. A pipeline is to a configuration file what a script is to a command. In other words, a pipeline comprises multiple configuration files executed sequentially. An embodiment of a pipeline comprises a string of names of configuration files on a command line. An alternative embodiment of a pipeline comprises a file containing the names of multiple configuration files to be sequentially executed.

An embodiment of the present invention features interactive routing, which comprises announcing to the caller, inter alia, that the call administration system is active, receiving optional input from the caller, and routing the incoming call in accordance with the caller's optional input. Routing may terminate (or connect) the incoming call to the subscriber or a subscription (i.e., subscriber) subsystem, such as a voice mail subsystem (VMS). Routing also includes disconnecting the incoming call.

A further embodiment includes an optional caller input comprising at least one of a bypass code, a bypass route option, and an unauthorized caller route option. Entry of a valid bypass code results in the connection of the incoming call to the subscriber. Entry of a valid bypass code followed by the entry of a bypass route option as menu responses results in the connection of the incoming call to the subscription subsystem associated with the bypass route option. And, entry of an unauthorized caller route option as a menu selection results in the connection of the incoming call to the subscription subsystem associated with the unauthorized caller route option. Note that an "unauthorized caller" comprises a caller whose call identification (comprising a name or a number) is not in the current access list. Unauthorized caller route options are provisioned by the subscriber.

Another embodiment implements the bypass code as a spoken bypass code. This embodiment employs off the shelf voice or speech recognition software to establish the validity of the spoken bypass code. As previously stated, voice recognition is specific to the speaker, while speech recognition recognizes words spoken regardless of the speaker.

Yet another embodiment comprises at least two auto-route options as being associated with the authorized caller identification in the access list (or access table). Allowing at least two auto-route options permits an incoming call (associated with the authorized caller identification) to be routed in a multicast fashion. In this way a conference, such as an audio or video conference, can be established by the call administration service.

An embodiment of the present invention comprises at least one secondary auto-route option for fail safe operations. Should the subscription subsystem associated with the at least one primary auto-route option be unavailable, then the secondary auto-route option permits the incoming call to be routed to a backup subscription subsystem.

Embodiments of the present invention permit the subscriber to set up a wide range of configuration scenarios. The subscriber provisioning information that can be instantiated comprises service activation times, bypass codes, authorized access numbers, authorized access names, routing options, journaling options, command entries, script entries, configuration file name entries, pipeline entries, directory entries, and priority options. Directory entries allow for the organizing of persistent files (configuration file entries, pipeline entries, access list files, bypass code files, journaling option files, etc.).

The present invention is extremely flexible in both provisioning and operational aspects. For instance there are multiple ways for a user to provision the call administration service. Not only is DMTF input available for simple provisioning tasks, but also several other methods exist. These include: voice input; a thin client, browser-based input via a cellular telephone; email of formatted files; and automated scanning of formatted files.

Additionally, persistent configuration files provide a significant level of flexibility beyond that of conventional systems. The subscriber can set up and store multiple scenarios in advance and have the present invention invoke a configuration file when needed. For instance, a month of July configuration file could be set up, saved, and later invoked by the system to program the service for operation during the entire month of July. Instructions may then be carried out for: (1) the subscriber's summer vacation week; (2) the subscriber's summer school mid-tern exam study nights; (3) the night of the Major League Baseball All Star Game; and (4) the Fourth of July holiday. In addition, the subscriber could have a "No Calls for the Rest of the Night" file stored on the system so that the subscriber could quickly set up this "no calls" scenario manually by merely telling the present invention to invoke that configuration file immediately—rather than go through the motions of entering the data to set up such a scenario each time it is needed.

Another benefit of persistent configuration files is that default files may be offered by the service provider in order to help a new subscriber get up and running. Configuration files may also be exchanged among subscribers so that more sophisticated users of the call administration service can help novice subscribers enjoy the full benefits of the call administration service's flexibility.

Another aspect of an embodiment of the present invention that accounts for the flexibility of the present invention is the availability of aperiodic system activation times, in addition to periodic times and single events. For example, "activate on this Monday from 7–11 AM, then Friday from 4–8 PM, and finally next Monday from 6–10 PM" can easily be programmed into a configuration file, rather than requiring a user to remember to set up these activation times separately.

From an operational standpoint, automatic routing of authorized callers (i.e., those callers whose numbers are in the access table) is also extremely flexible. If a caller's number (or other identification, such as the caller's name) is in an access table that is active for the current system configuration, then a subscriber has the option of connecting that caller to any valid subsystem including the subscriber's home phone. Other subsystems would include a cell phone, pager or a business voice mail system, in order to ensure that a salesman, for example, does not miss an expected call from a client. Multicasting is also available by specifying multiple routes in an access table. Multicasting is used to establish conference calls or video conferences (depending upon the source incoming call).

As a fail safe procedure, secondary routes may also be provisioned. If the primary system is unavailable, then a secondary route provides the subscriber with a backup subsystem for connecting the caller. In this way, the subscriber is less likely to miss a call altogether.

Also from an operational standpoint, interactive routing is available. In one embodiment, interactive routing allows a caller to state a bypass code to connect the incoming call to a subscriber subsystem. In the preferred embodiment, that subsystem is the subscriber's phone (home or cell phone), but another embodiment would permit a caller to select a subscriber subsystem with which to connect (and the available subsystem choices can be provisioned by the subscriber).

Another advantage of an embodiment of the present invention is the availability of a journaling feature. A subscriber has the option of enabling journaling to log the disposition of calls during the call administration activation period. Additionally, the information logged (such as caller name, caller number, date-time stamp, call disposition, etc.) is a configurable parameter. Using the journaling feature allows the subscriber to determine who called during the call administration activation period and where the call was routed.

An additional advantage provided by an embodiment of the present invention concerns cost control in the cellular environment. By way of example, when a salesperson leaves the local calling area, the salesperson may want to limit the calls that can be received on that salesperson's cellular phone to the most important calls, and redirect less important calls to a VMS. In this manner, the salesperson incurs long distance charges only for those calls that are of immediate concern or of a high priority.

Additional objects, advantages, and novel features of the invention will be set for the in part in the description which follows, and in part will become more apparent to those skilled in the art upon examination of the following, or may be learned by practice of the invention.

DETAILED DESCRIPTION

In the following discussion of embodiments of the present invention, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
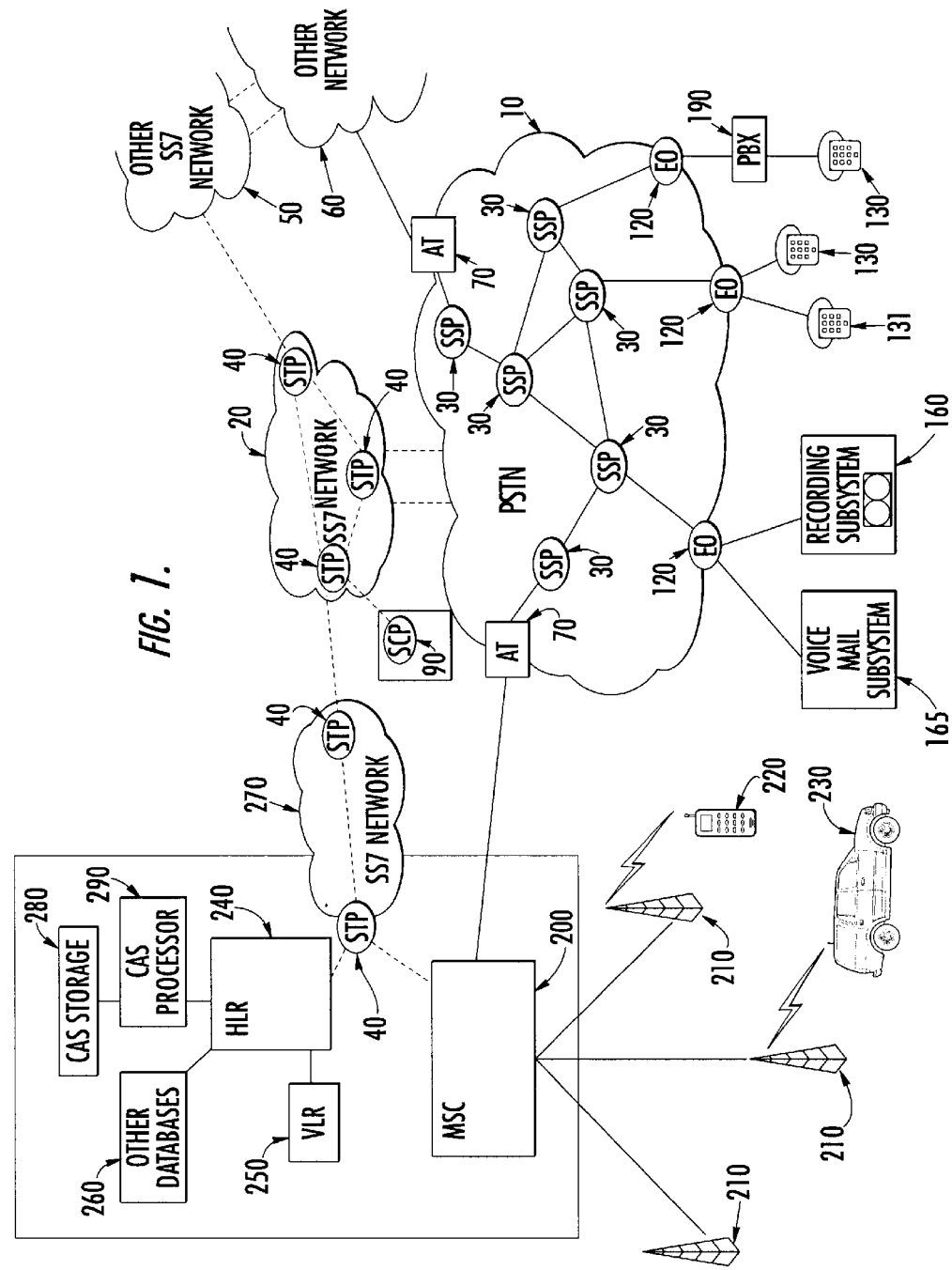
FIG. 1 comprises an embodiment of the present invention in a wireless network environment.

FIG. 1 comprises an embodiment of the present invention in a wireless network environment. Referring now to FIG. 1, a cellular network is shown. The cellular network comprises at least one Mobile Switching Center (MSC) 200, which interfaces to the Public Switched Telephone Network (PSTN) 10 via an Access Tandem (AT) switch 70. The PSTN 10 will be discussed in detail in FIG. 9. The MSC 200 manages many cell sites, each of which contains a base station and antenna 210. The MSC 200 must also be able to locate a stationary cell phone 220 and a mobile cell phone 230 (mobile because the user is in a car, for instance). Large cellular networks are comprised of multiple MSCs 200.

At the MSC facility 200, the MSC 200 interfaces with the Home Location Register (HLR) 240, the Visitor Location Register (VLR) 250, and Other Databases 260, such as an Authentication Center (AC) and an Equipment Identification Register (EIR), via an SS7 network 270. The HLR 240 contains location and service information about the subscriber. The VLR 250 contains roaming information about visiting cellular phones that have registered in the local area. The AC authenticates calls, while the EIR contains a list of illegal numbers, stolen phones and faulty equipment.

In one embodiment, the MSC 200 implements the call administration service (CAS) methods. In another embodiment, a CAS processor 290 implements the call administration service methods. CAS storage database 280 is utilized in another embodiment for storing subscriber provisioning information, comprising service activation times (comprising at least one of invocation points and termination points), bypass codes, authorized caller identification comprising authorized access numbers and authorized access names, routing options, journaling options, activators (comprising at least one of command entries, script entries, configuration file name entries, and pipeline entries), directory entries, and priority options. Note that activation times comprise at least one of a single event (i.e., Tuesday from 8 AM to 5 PM), a periodic event (i.e., every Tuesday from 8 AM to 5 PM), and an aperiodic event (i.e., Tuesday from 8 AM to 5 PM, Wednesday from 7 AM to 9 AM, and Friday from 11 AM to 1 PM).

When a caller using telephone 131 places a call to a subscriber using a cellular phone 220, an SSP 30 sends an AIN (Advanced Intelligent Network) query to SCP 90 via an SS7 Network 20. SCP 90 then communicates with HLR 240 via SS7 Networks 20 and 270. HLR 240 stores information about the subscriber, such as the subscriber's location. Once the subscriber is located, HLR 240 responds to the SCP 90, which sends the appropriate SSP 30 the information necessary to connect the caller to the subscriber's cellular phone 220. The incoming call is routed from the SSP 30, which is connected to the caller's end office 120, through the PSTN 10 to the MSC 200. The MSC 200 locates the cellular subscriber's cellular phone 220 using information obtained from the HLR 240 and routes the incoming call to the appropriate base station 210. The base station 210 converts the landline signal of the incoming call to a cellular signal, and transmits the incoming call to the subscriber's cellular phone 220.

In one embodiment of the present invention, the subscriber activates the call administration service by sending an activator to the CAS processor 290. An activator, in one embodiment, comprises a feature code, such as *88, which is entered via a DTMF data entry interface to the CAS processor 290. After receiving the activator, the CAS processor 290 then sets an activation status flag.

Once the call administration service is activated, the CAS processor 290 routes an incoming call in accordance with subscriber provisioning information. For instance, if the caller using telephone 131 is an authorized caller (i.e., the caller's number for telephone 131 appears in subscriber provisioning information comprising an access table), then the CAS processor 290 receives incoming call information from the SCP 90 by way of the HLR 240 and extracts the caller number from the incoming call information. CAS processor 290 then compares the extracted caller number to the caller numbers in the access table. If a match is found, the CAS processor 290 next extracts a primary auto-route number associated with the caller number in the access table.

CAS processor 290 uses the primary auto-route number to look up an address in the CAS storage 280 for a subsystem associated with the primary auto-route number. If the auto-route number is associated with the subscriber's cell phone 220, then the CAS processor 290 sends a connect message via the HLR 240 to the MSC 200 requesting the connection of the incoming call to the subscriber's cellular phone 220.

Figure 2:
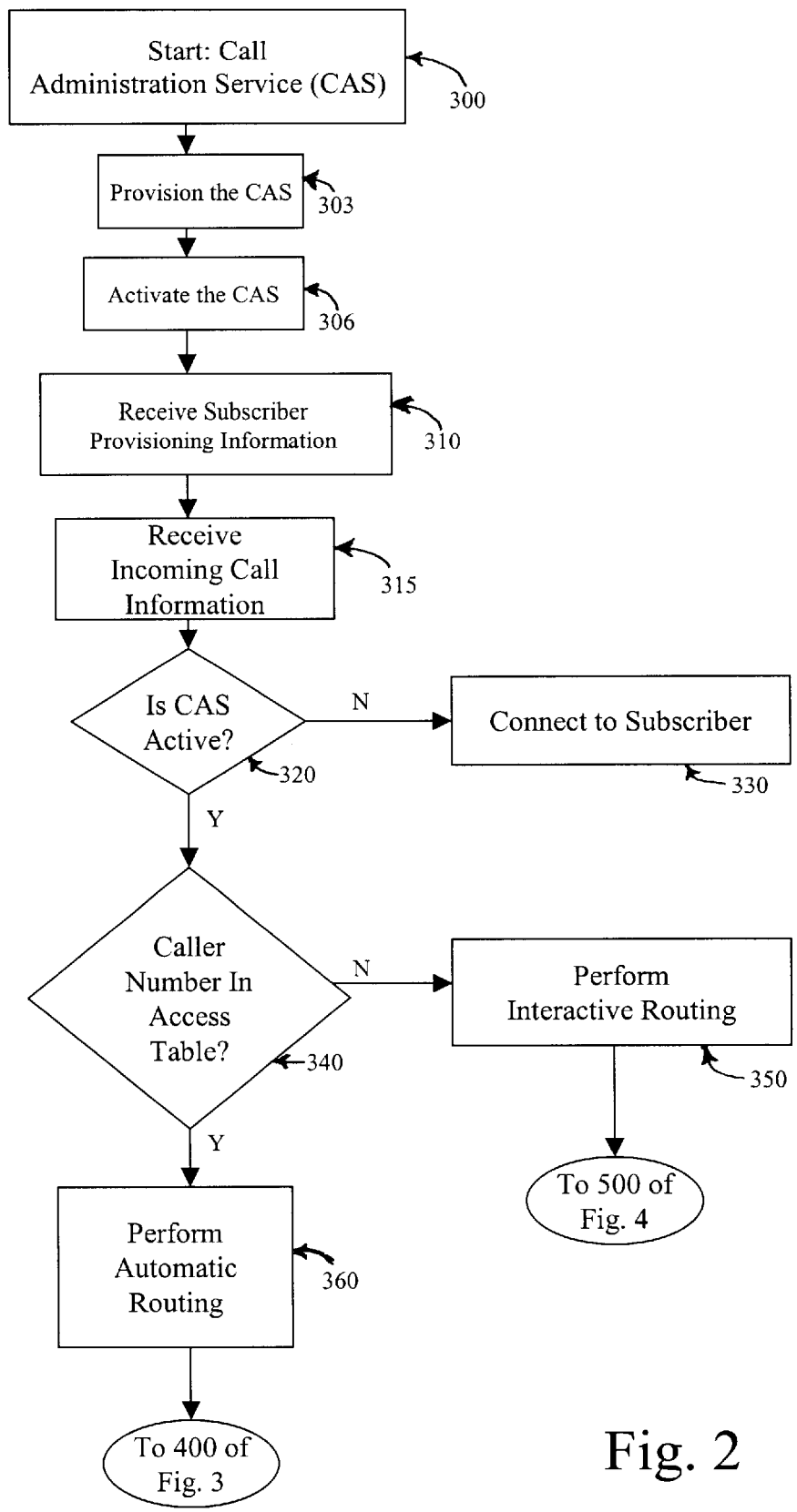
FIG. 2 comprises an overall flow diagram of an embodiment of the present invention in a wireless network environment.

FIG. 2 comprises an overall flow diagram of an embodiment of a method of the present invention in a wireless network environment. In one embodiment, the CAS processor 290 starts the call administration service routine in step 300 when the subscriber is added to a list of call administration service subscribers by the service provider. The subscriber provisions the call administration service in step 303 by establishing a data entry interface to the CAS processor 290.

Provisioning, in the embodiment shown in FIG. 2, comprises the process of data entry by a subscriber using a data entry interface to the CAS processor 290 to configure the call administration system. An embodiment of the present invention provides a DTMF (Dual Tone Multiple Frequency) menu response system to provision the call administration service. Alternate embodiments provide for voice processing and speech processing data entry using commercial off the shelf software, a browser form of data entry and a formatted file translation data entry mechanism. The browser form of data entry may be implemented on a thin client device or a cellular phone in alternate embodiments. After receiving provisioning information from the subscriber in step 303 via a provisioning data entry interface, CAS processor 290 then stores the provisioning information in CAS storage database 280. CAS storage database 280 comprises secondary storage for persistent subscriber provisioning information.

The CAS processor 290 activates the call administration service in step 306. In one embodiment of the present invention, the CAS processor 290 receives a system activator from the subscriber provisioning information. The system activator comprises at least one of a command, a script, a configuration file name and a pipeline. The CAS processor 290 receives from the subscriber provisioning information an activation time comprising at least one of an invocation point (or start time and/or date) and a termination point (or ending time and/or date). The CAS processor 290, using an activation setter, sets an activation flag or semaphore during periods of service activation.

In step 310, CAS processor 290 receives subscriber provisioning information from CAS storage database 280. Alternatively, the subscriber provisioning information is set directly by the subscriber via a provisioning data interface to the CAS processor 290 as the current configuration. This particular provisioning data interface gives the subscriber the option of storing subscriber-entered provisioning information, setting the subscriber-entered provisioning information as the current configuration, or simultaneously storing and setting (as the current configuration) the subscriber-entered provisioning information.

Next, in step 315, the CAS processor 290 receives incoming call information, comprising a caller identification, such as a caller number or caller name. The incoming call information is extracted from the TCAP information by the CAS processor 290.

In step 320, the CAS processor 290 determines if the subscriber has activated the call administration service. An embodiment implements this step by checking a flag or semaphore which indicates the call administration service activation status. If the system has not been activated, then in step 330 the incoming call is connected to the subscriber.

If the call administration service is active, then in step 340, the CAS processor 290 searches the current access table for a caller identification, such as a caller number. In another embodiment, a caller identification comprises a caller name. If the caller identification is not found within the current access table, then the CAS processor 290 performs interactive routing at step 350. Interactive routing is discussed in further detail starting at step 500 in FIG. 4. Otherwise, if the caller identification is found in the current access table the CAS processor 290 performs automatic routing at step 360. Automatic routing is discussed in further detail starting at step 400 in FIG. 3.

Figure 3:
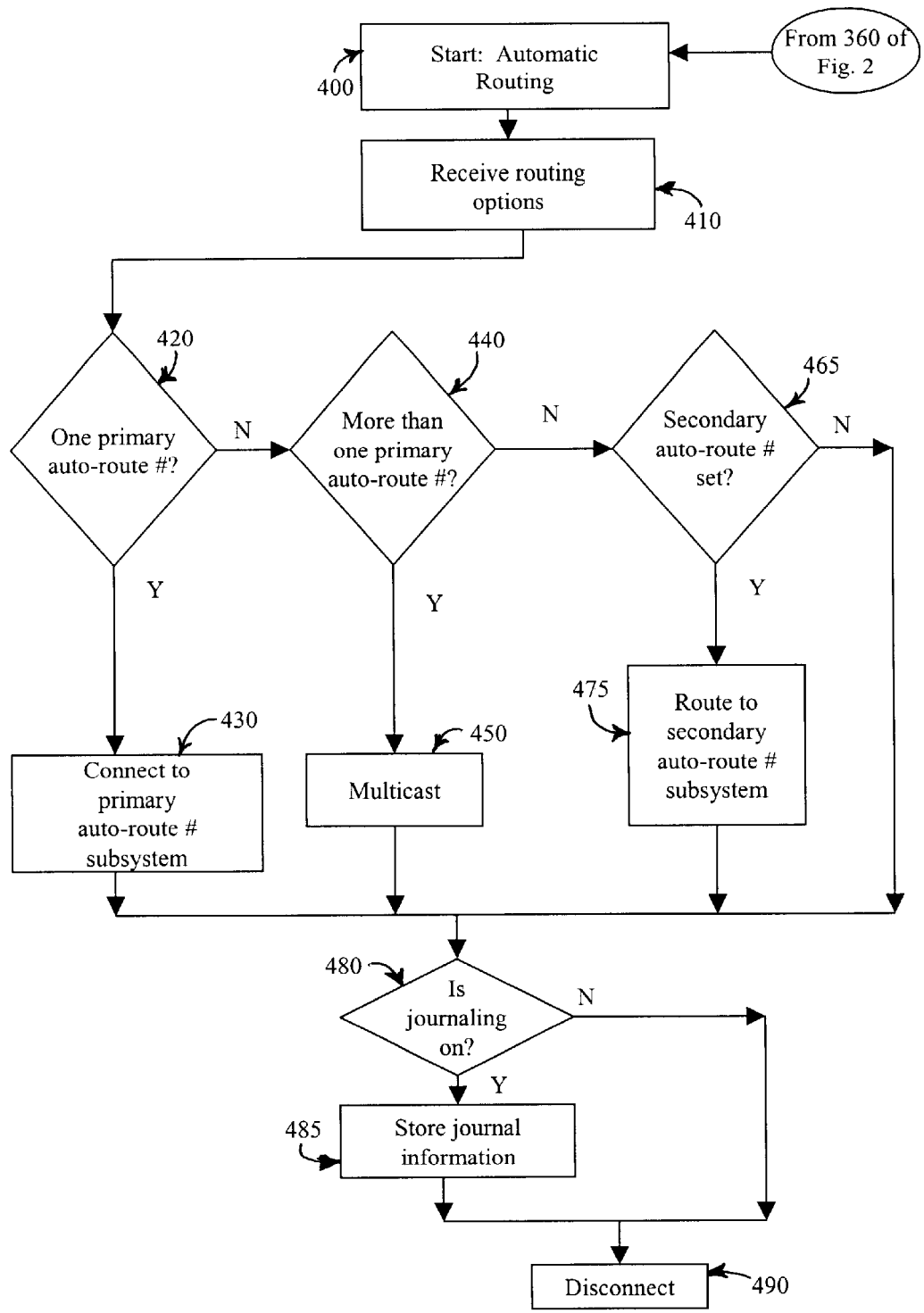
FIG. 3 comprises a flow chart of the automatic routing feature of an embodiment of the present invention in a wireless network environment.

FIG. 3 comprises a flow chart of the automatic routing feature of an embodiment of the present invention in a wireless environment. The CAS processor 290 starts the automatic routing methods at step 400. In step 410, the CAS processor 290 receives auto-routing options from the subscriber provisioning information (i.e., from an access table, in one embodiment).

At step 420, the CAS processor 290 checks the (currently active) access table to I determine if one primary auto-route number is associated with the authorized caller. If exactly one primary auto-route number associated with the authorized caller exists, then the CAS processor 290 connects the incoming call to that primary auto-route subsystem represented by the primary auto-route number. In one embodiment, if the primary auto route number is "0", then the incoming call is connected to the subscriber's home phone Note that subsystems comprise service provider systems (such as voice mail subsystems) I 5 and end user "systems" (such as home phones, cellular phones, BLUETOOTH communication devices, and PBXs). If CAS processor 290 at step 420 determines that there is not exactly one primary auto-route number associated with the authorized caller, then at step 440 the CAS processor 290 determines whether there is more than one primary auto-route number in I 10 the access table. If more than one primary auto-route number exists in the access table, then the CAS processor 290 connects the incoming call to each subsystem (specified by a primary auto-route number) in a multicast fashion. In this manner, a video or audio conference may be established.

If CAS processor 290 at step 420 determines that there is not exactly one primary auto-route number associated with the authorized caller, then at step 440 the CAS processor 290 determines whether there is more than one primary auto-route number in the access table. If more than one primary auto-route number exists in the access table, then the CAS processor 290 connects the incoming call to each subsystem (specified by a primary auto-route number) in a multicast fashion. In this manner, a video or audio conference may be established.

At step 465, the CAS processor 290 checks the (currently active) access table to determine if a secondary auto-route number associated with an authorized caller exists within the access table. The CAS processor 290 executes step 465 if, after executing steps 420 and 440, the CAS processor 290 has determined that no primary auto-routes were specified in the access table (i.e., if one or more primary auto-routes were not specified, then no auto-routes were specified).

Note that in one embodiment, the CAS processor 290 determines whether subsystems are available. Routing of an incoming call takes place only if a subsystem is (or subsystems are) available. A subsystem is available if an incoming call can be connected to or terminated at the subsystem. Exemplary reasons a subsystem may be unavailable or unreachable include i) called party does not subscribe to a service implemented by that subsystem (i.e., VMS), ii) communications path is down, and iii) device (i.e., phone) is "off hook". CAS processor 290 determines that a called party does not subscribe to a service by querying a subscriber service database. CAS processor 290 determines that a communications path is down or that a device is off hook upon receipt of an appropriate TCAP message.

If a secondary auto-route number exists in the (currently active) access table, as determined by the CAS processor 290 in step 465, then in step 475 the CAS processor 290 routes the incoming call to that secondary subsystem. In this manner, a fail safe routing mechanism is provided to route to a backup subsystem.

After the CAS processor 290 has routed an incoming call according to step 430, 450, or 475, or the CAS processor 290 has not connected an incoming call after executing step 465, the CAS processor 290 then determines whether the subscriber has requested journaling in step 480 by reading a journaling status flag. Journaling is the logging of information about an incoming call. Logged information comprises at least one of a caller name, a caller number, a date/time stamp and the incoming call disposition (i.e., connected to subscriber, multicast, connected to a primary auto-route number subsystem, etc.). If the subscriber has requested journaling, then the requested journaling information is stored at step 485 in CAS storage database 280.

In one embodiment, stored journaling information may be formatted and viewed via a graphical user interface (GUI). Formatting includes HTML formatting. A subscriber may then subsequently view the HTML-formatted journaling information using a browser on a thin or thick client. In another embodiment, stored journaling information may be transferred electronically to another database for follow-on processing by a system such as the Personal Call Manager.

The Personal Call Manager comprises computer programs, computer systems, and telephone systems that allow a customer (i.e., a subscriber) to retrieve real-time and historical information concerning the customer's use of a telecommunications system. This information is known as a usage pattern. A usage pattern comprises at least one of i) the number of telephone calls made by the customer during a billing cycle, ii) the number of telephone calls received by the customer during the billing cycle, iii) telephone numbers called by the customer during the billing cycle, iv) telephone numbers calling the customer during the billing cycle, v) date of each telephone call made by the customer during the billing cycle, vi) time of each telephone call made by the customer during the billing cycle, vii) duration of each telephone call made by the customer during the billing cycle, viii) identity of a calling party terminating a call before the customer answers the call, and ix) the number of unused minutes remaining in the billing cycle. A processor accesses a database of usage patterns and acquires the usage pattern. If a reader desires a more detailed explanation of the Personal Call Manager system, the reader is directed to U.S. patent application Ser. No. 09/938,922, entitled "Methods and Systems for Providing Usage Pattern Service for Telecommunications Customers", filed Aug. 24, 2001 by Michael A. Griffiths, and incorporated herein by reference in its entirety.

The CAS processor 290 determines whether journaling is turned on at step 480, and, if so, stores the collected journaling information at step 485. The incoming call is disconnected at step 490.

In an alternate embodiment, the incoming call disconnect step 490 includes adding call duration to the stored journaling information. Call duration is not known until disconnect.

At step 350 of FIG. 2, the CAS processor 290 performs interactive routing. Interactive routing requires input from the incoming caller in order to connect the incoming call.

Figure 4:
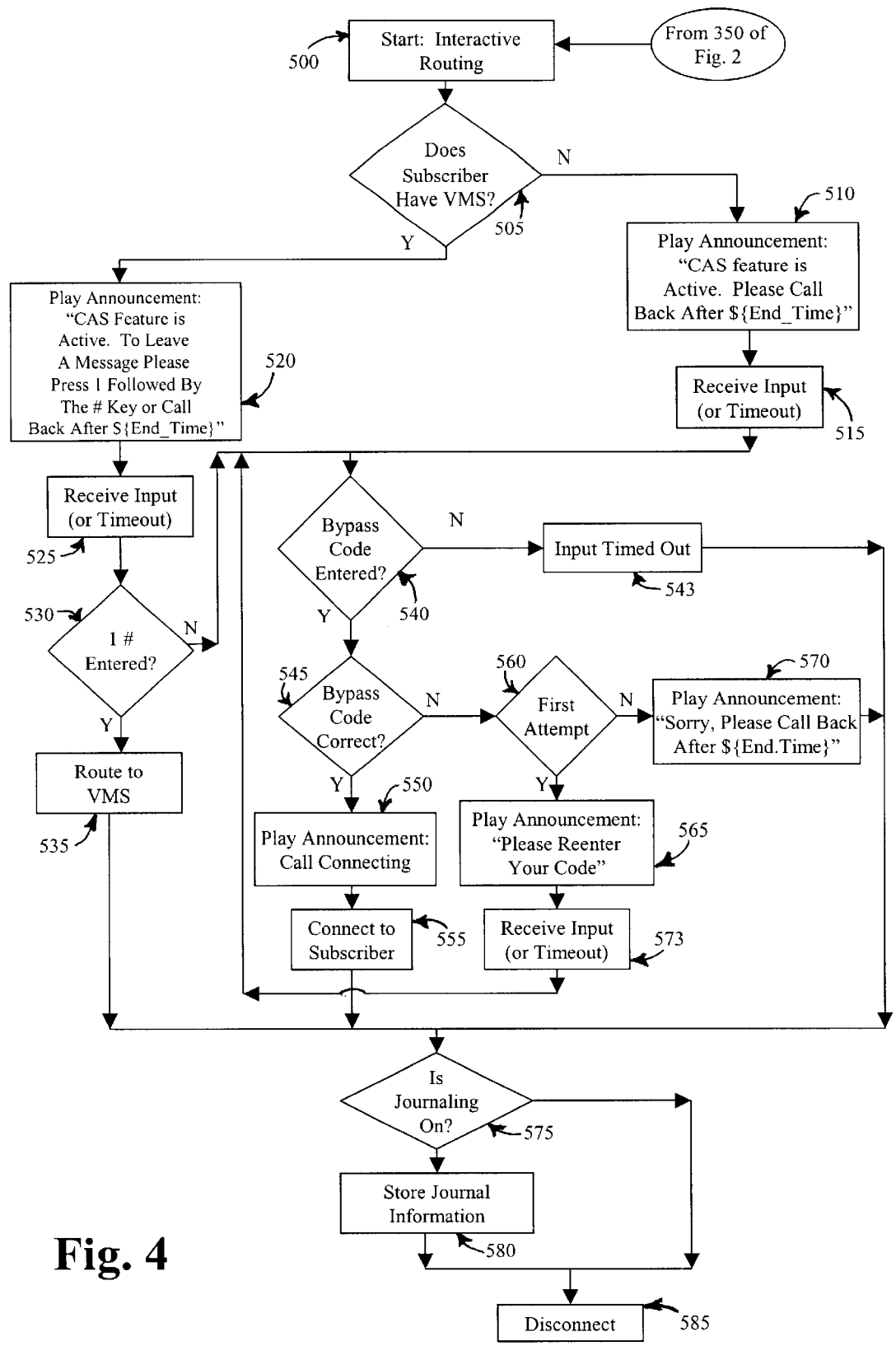
FIG. 4 comprises a flow chart of the interactive routing feature of an embodiment of the present invention in a wireless network environment.

Step 350 of FIG. 2 continues at step 500 of FIG. 4, which depicts a flow chart of the interactive routing feature of an embodiment of the present invention in a wireless network environment. The CAS processor 290 starts executing interactive routing methods at step 500. And, for this particular embodiment, in step 505 the CAS processor 290 determines whether the subscriber has a Voice Mail Subsystem (VMS) 165.

If the subscriber does not have VMS 165, then the CAS processor 290 presents an announcement in step 510 informing the caller that the call administration service is active, and that the caller should call back after the service activation time ends. At this point, the caller has a time-limited option to enter a bypass code in step 515, which will be received or captured by the CAS processor 290. Should the caller not enter an option, the CAS processor 290 times out, setting the caller input to NULL.

If the subscriber does have VMS 165, then the CAS processor 290 displays an announcement in step 520 informing the caller that the call administration service is 25 active, and that the caller may leave a message for the subscriber. The "display" of an announcement comprises at least one of an audio display (i.e., the playing of an audio version of the announcement) and a video or visual display (i.e., displaying an announcement on a display screen of a thin client device, for example). The term "presents" is used in this context to mean "displays." Additionally, an announcement 30 comprises at least one of an announcement and a menu. Also, examples of thin client I devices include, but are not limited to, cellular phones, PALM devices, hand held computers and BLUETOOTH communication devices.

In step 525, the caller has a time-limited option of entering a menu response number to invoke the VMS service 165 or entering a bypass code. Caller input is received or captured by the CAS processor 290 in step 525, or the CAS processor 290 sets the caller input to NULL in the event of a timeout. Note that other embodiments provide additional subscriber subsystems (beyond just a VMS service 165) which an unauthorized caller (i.e., a caller who is not in the access table for auto-routing) may chose by entering the correct subsystem number (presented in the announcement), or the caller may be given the option of entering only a "#" symbol, for example, to escape (and disconnect). In such an embodiment, the CAS processor 290 routes the incoming call to the subsystem associated with the caller-entered unauthorized caller route option. For instance, menu options may be presented to the caller for connecting to a VMS 165 ("1#"), a fax subsystem 180 ("2#") or a mobile phone 230 ("3#"). The incoming call is then routed according to the caller's menu selection. Note that unauthorized caller route options are provisioned by the subscriber.

In step 530, the CAS processor 290 determines whether "1#" has been entered by the caller. If "1#" has been entered, the CAS processor 290 enables routing of the incoming call to the VMS service 165 in step 535.

If "1#" has not been entered by the caller, the CAS processor 290 determines whether a bypass code has been entered in step 540 and checks the validity of the bypass code in step 545. The validity check is performed by the CAS processor 290 by comparing the caller-entered bypass code to the at least one bypass code stored in CAS storage database 280 as subscriber provisioning information. Various embodiments of the call administration service include entry mechanisms for the bypass code of at least one of DTMF, voice and speech input, where voice input is speaker specific, but speech input is not speaker specific. Both voice and speech recognition processing may be implemented in embodiments using commercial off the shelf voice and speech recognition software. If the correct bypass code has been entered by the caller, then in step 550 the CAS processor 290 presents an announcement that the call is connecting, and connects the incoming call to the subscriber in step 555.

If a bypass code is not entered in a timely manner, as determined by the CAS processor 290 in step 540, then the CAS processor 290 times out in step 543. The CAS processor 290 then sets the caller input to NULL.

If an invalid bypass code is detected by CAS processor 290 in step 545, then, if the caller has only tried once to enter the correct bypass code (as determined by CAS processor 290 in step 560), the caller is given a second chance to enter the correct bypass code. The CAS processor 290 first presents (i.e., displays) an announcement in step 565, then receives the caller's input (or times out) in step 573. Processing then returns to step 540, where the CAS processor 290 determines whether a bypass code entry exists.

If the bypass code is invalid for a second time, as determined by the CAS processor 290 in step 560, then the CAS processor executes step 570. In step 570, the CAS processor 290 presents an announcement suggesting that the caller please call back at a later time.

After the CAS processor 290 has executed one of steps 535, 543, 555, or 570, then the CAS processor 290 determines whether the subscriber has requested journaling in step 575. If the subscriber has requested journaling, as determined by the CAS processor 290 in step 575 (by determining whether a journaling semaphore has been set), then the requested journaling information is stored in CAS storage database 280 at step 580.

In one embodiment, stored journaling information may be formatted and viewed via a graphical user interface (GUI). Formatting includes HTML formatting. A subscriber may then subsequently view the HTML-formatted journaling information using a browser on a thin or thick client. In another embodiment, stored journaling information may be transferred electronically to another database for follow-on processing by a system such as the Personal Call Manager.

The incoming call is disconnected at step 585 after the CAS processor 290 executes step 580, or the CAS processor 290 has executed step 575 and determined that journaling is not requested. In another embodiment, the incoming call disconnect step 585 includes adding call duration to the stored journaling information.

Figure 5:
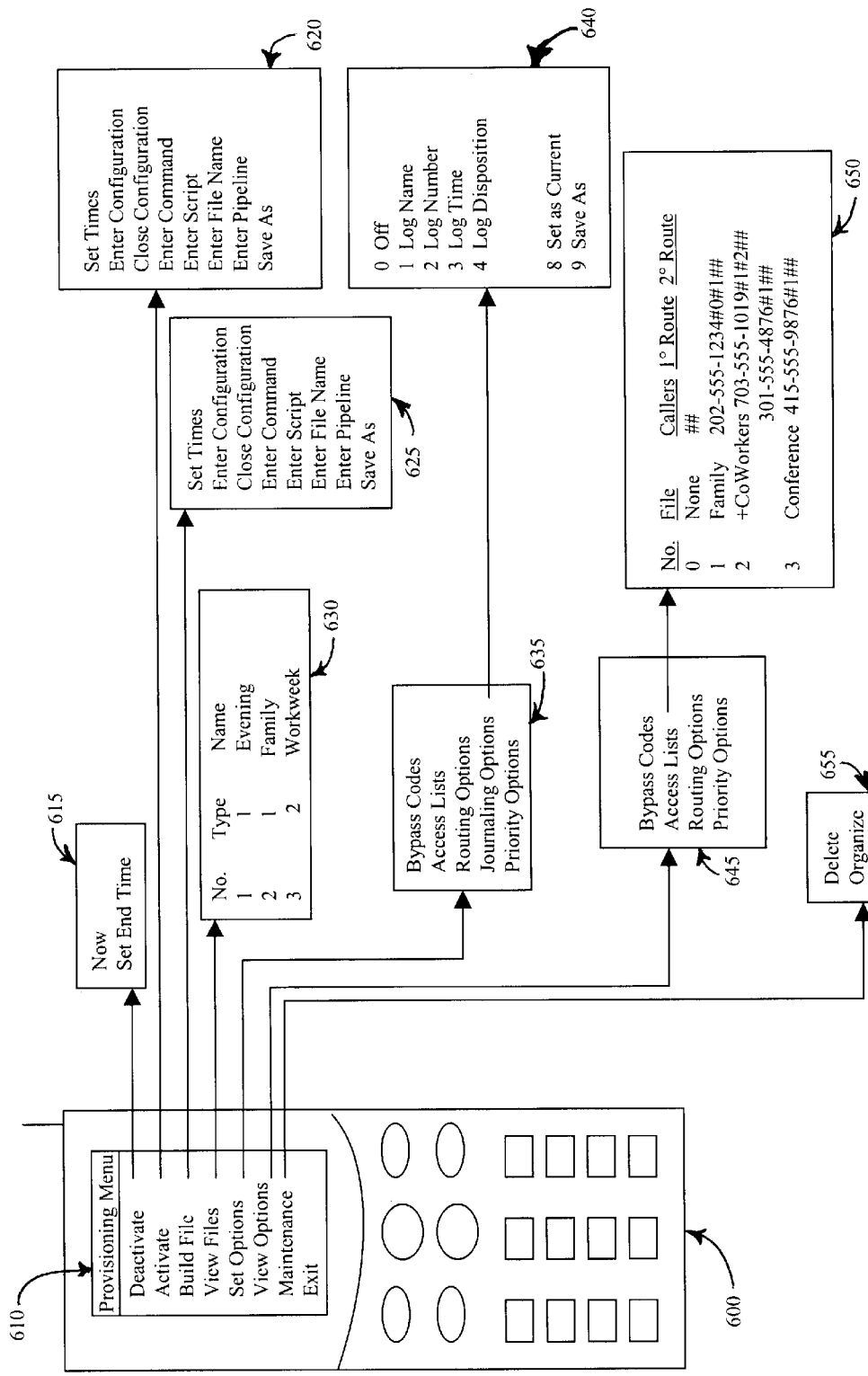
FIG. 5 comprises an exemplary illustration of using a thin client browser on a cellular telephone for provisioning of the present invention.

Various embodiments of the present invention provide different mechanisms for entering subscriber provisioning information. FIG. 5 comprises an exemplary illustration of using a thin client browser for provisioning of the present invention. Examples of thin clients include, but are not limited to, cell phones, PALM devices, hand held computers, 30 and BLUETOOTH communication devices. Referring to FIG. 5, a cellular telephone 600 is shown as a thin client device with a top level provisioning and activation screen 610. Several lower level menus are also shown.

The first lower level screen 615 appears upon a subscriber's selection of "Deactivate" in the top level screen 610. The Deactivate screen 615 allows a subscriber to chose to deactivate the call administration service immediately or to set an end time at which the service automatically deactivates.

Upon the subscriber selecting "Activate" in top level screen 610, activation screen 620 appears allowing the subscriber to set various provisioning options. These options comprise service activation times, command entries, script entries, configuration file name entries, and pipeline entries. In one embodiment, command entries comprise feature code strings that instruct the call administration service to activate during a certain provisioned time period. Scripts concatenate several commands, which are then executed one after the other. File names are configuration files. Persistent configuration files enable the call administration service's flexibility. A configuration file is kicked off once, and then the file sets up different call administration service scenarios that automatically configure themselves based upon the subscriber-specified provisioning information contained within a configuration file. Pipelines are analogous to scripts. However, pipelines are a concatenation of more than one configuration file name. These concatenated configuration file names execute one after the other and may be entered as a string of file names at a computer input prompt. Note that a configuration file can also implement a pipeline by listing multiple configuration file names as the provisioning information within the pipeline.

The subscriber selects the "Build File" option in the top level screen 610 on the subscriber's cell phone 600 to arrive at a screen 625 for inputting provisioning information within a configuration file. This provisioning information comprises set times entries, configuration entries, command entries, script entries, configuration file name entries, pipeline entries and a save as option as shown in screen 625.

The subscriber selects the "View Files" option in top level screen 610 to list files available for provisioning the call administration service in lower level screen 630. Note that default files can be provided to the subscriber by the service provider for common configuration scenarios. Note also that since these files are permanently stored (in CAS storage database 280, for example), configuration files can be swapped among subscribers. And, these configuration files can even be created offline and later transferred (via email, FTP, etc.) to the CAS storage database 280, thereby decreasing the processing load on the CAS processor 290 that can be attributed to subscriber provisioning. Another embodiment of the present invention arranges these configuration files in subscriber-specified directories to organize large numbers of files.

The subscriber selects "Set Options" in top level screen 610 to expose screen 635, which lists provisioning options that the subscriber can set. These options comprise bypass codes, access lists (including authorized names and numbers), routing options, journaling options and priority options. Priority options specify which active configuration takes precedence in a situation in which two or more configurations have accidentally been activated at the same time. In one embodiment, a priority option instructs the CAS processor 290 that the last activated configuration prevails if there is a conflict involving provisioning parameters.

Upon selecting "Journaling Options" in screen 635, the CAS processor 290 presents the subscriber with screen 640. Various journaling configuration options are shown in screen 640 comprising turning off journaling, the information to log, setting the selected options as the current configuration and for saving a journaling set up as a journaling configuration file.

The subscriber selects "View Options" in top level screen 610 and is presented with screen 645 containing a list of categories of viewable provisioning information. Further selection of "Access Lists" allows a subscriber to view access lists or access tables that may be used to configure the call administration service. Screen 650 contains four exemplary access lists (numbered 0 through 3). Access list 0 (saved under the filename "None") essentially turns off automatic routing by not permitting any authorized callers. Access list 1 automatically routes incoming calls from only one number to the subscriber (i.e., the primary auto-route number is "0"), and also contains a secondary route (to subsystem 1). Access list 2 automatically routes incoming calls from two numbers, and contains a secondary route only for the first number on the access list. Access list number 3 (saved under the filename of "Conference") sets up a conference call by routing an incoming call from the specified number to three places (i.e., to subsystems 3 and 4, and to the subscriber's phone, designated as "0").

The subscriber may select a "Maintenance" option in top level screen 610 to view selectable maintenance options in screen 655. Exemplary options comprise deleting, organizing (i.e., inputting directory entries under which to organize provisioning files, such as configuration file name entries, access list filenames, etc.) and archiving old files.

Figure 6:
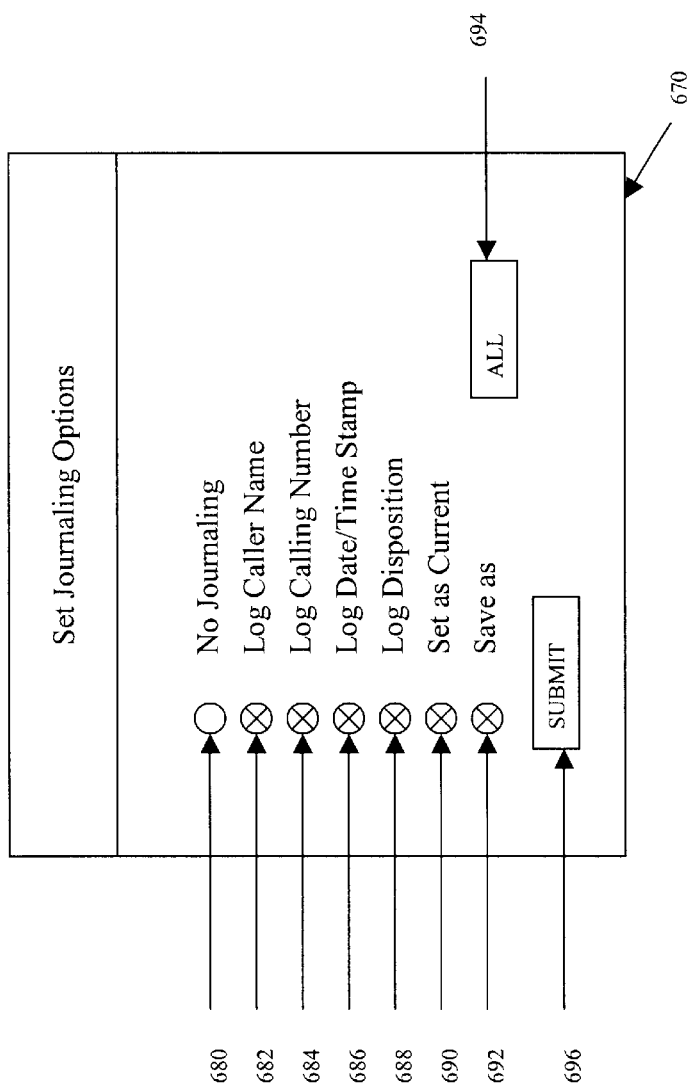
FIG. 6 comprises an exemplary illustration of using a thin client browser on a cellular telephone to fill out a form for the provisioning of the present invention.

In one embodiment, forms are filled out by the subscriber to specify provisioning information for the call administration service. FIG. 6 comprises an exemplary illustration of the use of a thin client browser in filling out a form for provisioning the present invention. As an alternative to screen 640 presented in FIG. 5, a browser form for a thin client such as a cell phone is presented in FIG. 6. Using this form 670, a subscriber merely selects check boxes for logging a caller name 680 and a caller number 684, a date/time stamp 686 and a disposition 688 of the incoming call. The subscriber also selects the "Save as" check box 692 and enters a file name, "ALL", in text field 694 for saving the selected journaling options. The "Set as Current" check box 690 is also chosen, because a subscriber wishes to implement these journaling options immediately, as well as save them in a file named "ALL" for future use. Selecting the check box labeled "No Journaling" 680 turns off journaling. When the subscriber is finished selecting journaling options, the subscriber selects the "Submit" button 696.

Figure 7:
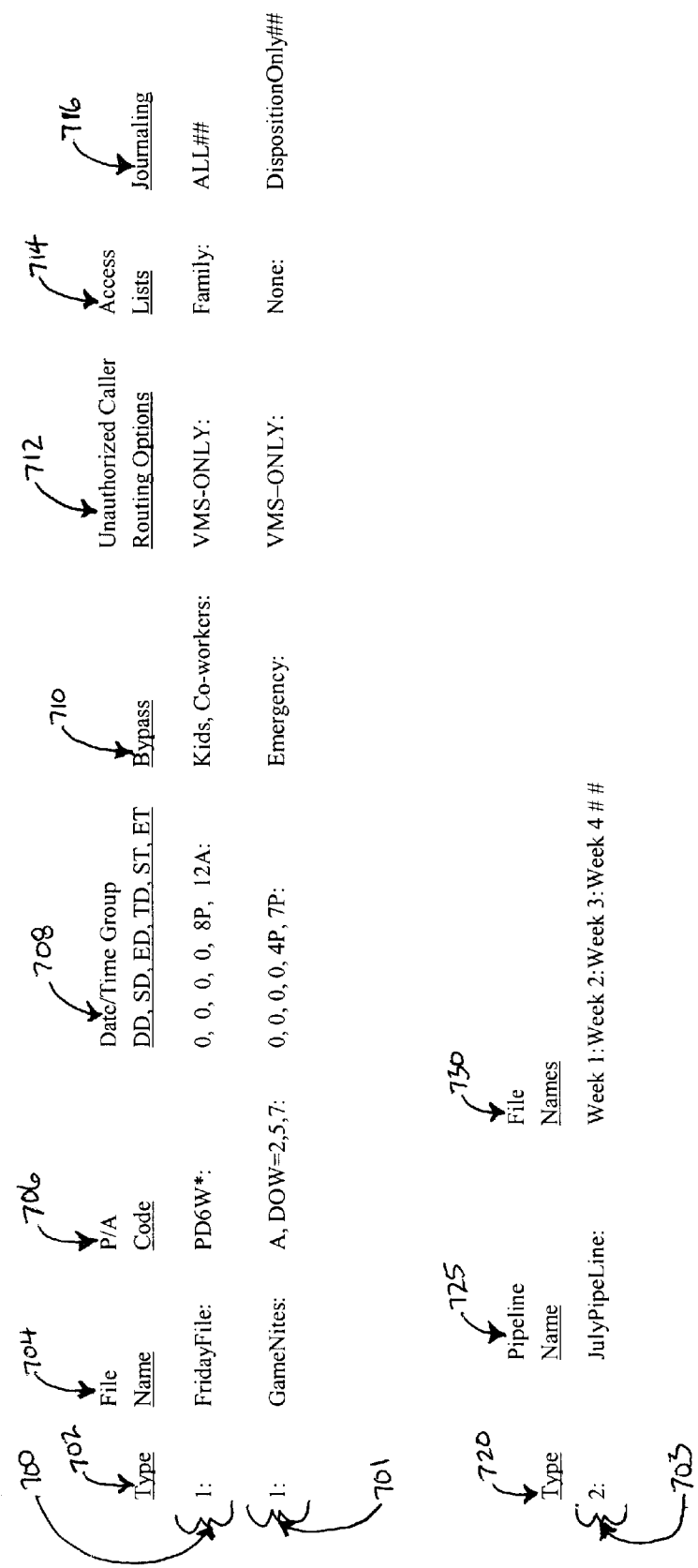
FIG. 7 comprises an exemplary configuration file and pipeline for flexible provisioning of the present invention.

Subscriber provisioning information is stored in formatted records within a file (i.e., a formatted file). FIG. 7 comprises an exemplary configuration file and pipeline for flexible provisioning of the present invention. Referring to FIG. 7, examples of two configuration file formats and a pipeline file format are shown. A configuration file named "FridayFile" is shown at 700. FridayFile 700 comprises a "Type" field 702, which describes the type of file (1=file, 2=pipeline), a File Name field 704 ("FridayFile"), a Periodic/Aperiodic (or P/A) code 706, which is read by the CAS processor 290 as the time periods to execute this particular configuration file. For instance, the P/A code 706 shown for FridayFile 700 ("PD6W*") tells the CAS processor 290 that the FridayFile 700 should be executed periodically ("P") on Fridays (day 6 or "D6") every week ("W*"). This is in contrast to the aperiodic run times set for the "GameNites" configuration file 701. The P/A code 706 for GameNites 701 is "A,DOW=2,5,7", which indicates to the CAS processor 290 that this configuration file should be executed aperiodically ("A") on Days of the Week ("DOW") Monday ("2"), Thursday ("5") and Saturday ("7").

Continuing to look at the format of the configuration file named FridayFile 700 in FIG. 7, a date/time group field 708 is shown next. The date/time group field 708 comprises subfields DD (Date Duration), SD (Start Date), ED (End Date), TD (Time Duration), ST (Start Time) and ET (End Time). The DD field permits the subscriber to provision a date duration (i.e., tells the CAS processor 290 to execute the file for DD days starting now). The SD and ST subfields are also known as invocation points, which tell the CAS processor 290 the date and time, respectively, to start executing the file. The ED and ET subfields are also known as termination points, which tell the CAS processor 290 the date and time, respectively, to stop executing the file.

The other fields within a configuration file in this particular embodiment of the present invention include: a bypass field 710, comprising a bypass options file name in this example; an unauthorized caller routing options field 712, comprising a file name for routing options available to the unauthorized (or interactively routed) caller; an access list field 714, comprising access list files of the identification of authorized callers that will have their calls automatically routed; and a journaling field 716, comprising a name of a file of journaling options. An alternate embodiment further comprises an auto-routing options field comprising a file of subsystem identifications. Such subsystems comprise the terminating points of an auto-routed incoming call. Further embodiments comprise an auto-routing options field comprising at least one of an alias (to a device such as a pager or to a voice mail subsystem, as examples) or an address (such as a phone number or device's network address).

An embodiment of a configuration that implements a pipeline is also shown in FIG. 7. "JulyPipeLine" 703 contains a Type field of "2", indicating that this "file" is of type "pipeline". Although a pipeline may be implemented dynamically, by listing multiple files on a command line to be executed consecutively, a configuration file can also contain the names of multiple files to be consecutively executed by the CAS processor 290. Once the CAS processor 290 recognizes the file as having a type of "2" as shown in Type field 720, the processor 290 determines the name of the pipeline from the PipeLine Name field 725 (in this case "JulyPipeLine"). Since a pipeline (or record of type "2") has no required maximum length, the CAS processor 290 must read each file name in the File Names field 730 until a record delimiter (such as "##") is encountered. In the present example, the JulyPipeLine record 703 contains references to four configuration files entitled "Week1", "Week2", "Week3", and "Week4" in the File Names field 730. Therefore, when the CAS processor 290 is presented with the JulyPipeLine 703 record, the CAS processor 290 will actually execute the files Week1, Week2, Week3, and Week4 consecutively. The configuration times and routing, access, bypass, journaling, etc., options are set internally to the Week1, Week2, Week3, and Week4 configuration files.

Figure 8:
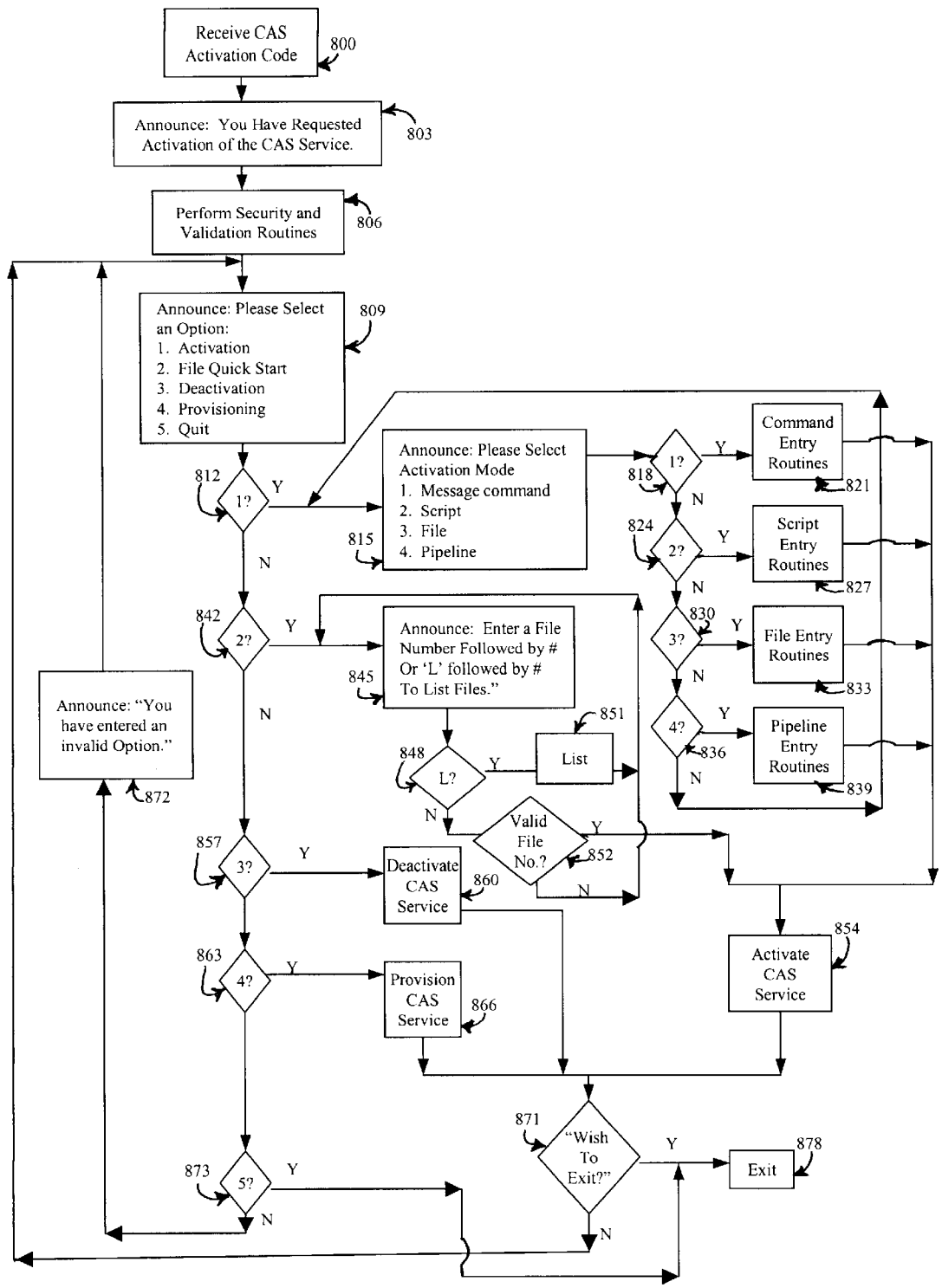
FIG. 8 comprises a flow chart of exemplary activation/deactivation/provisioning processes for an embodiment of the present invention.

FIG. 8 comprises a flow chart of the activation/deactivation/provisioning process for an embodiment of the present invention. In step 800 the CAS processor 290 receives an activator from the subscriber provisioning information, such as a *88 feature code command as DTMF input in one embodiment. In an alternative embodiment, the subscriber dials a CAS activation number and requests activation via spoken words such as "Activate CAS". These spoken words in the alternative embodiment are collected by the CAS processor 290 and processed by a voice processing software subsystem residing on the CAS processor 290. Next, the CAS processor 290 in step 803 presents an announcement stating "You have requested activation of the call administration service". Presenting an announcement comprises displaying an announcement.

The CAS processor 290 performs security and validation routines, such as subscriber identification and password checking, in step 806. Once the subscriber has been validated, in step 809 the subscriber is presented with menu options comprising activation, file quick start, deactivation, provisioning and quitting the menu.

In step 812, the CAS processor 290 determines whether the subscriber has chosen selection #1 "Activation". If so, the CAS processor 290 presents another menu to the subscriber in step 815, asking the subscriber to chose an activation mode (i.e., by command, script, configuration file or pipeline). In step 818 the CAS processor 290 determines whether a command will be used to activate the caller administration service. If so, then the command entry routines are executed in step 821. If not, then the CAS processor 290 determines whether a script will be used to activate the caller administration service in step 824. If script activation is selected by the subscriber, then the script entry routines are executed in step 827. If not, then the CAS processor 290 determines in step 830 whether file activation will be used. If configuration file activation is selected, then the file entry routines are executed by the CAS processor 290 in step 833. If not, then the CAS processor 290 determines whether pipeline activation will be used in step 836. If pipeline activation is selected, then the pipeline entry routines are executed by the CAS processor 290 in step 839. After the CAS processor 290 has determined one of steps 818, 824, 830 or 836 to be the selected activation method (and the appropriate entry routines of steps 821, 827, 833 or 839 have been executed), then the CAS processor 290 activates the call administration service in step 854.

In step 842, the CAS processor 290 determines whether the subscriber has chosen selection #2 "File Quick Start" from the menu presented in step 809. If so, then the CAS processor 290 presents an announcement in step 845, requesting input of a file number or "L" to list available files. If the CAS processor 290 determines that an "L" has been input in step 848, then the available files are listed, as per step 851, and control loops back to step 845 for the presenting of an announcement prompting a subscriber for input of a file number (or "L"). If "L" has not been input by the subscriber, then the CAS processor 290 validates the file number input in step 852. Once a valid file number is received in step 852, then the CAS processor 290 activates the call administration service in step 854. If the file number is invalid, as determined by the CAS processor in step 852, then control returns to step 845.

In step 857, the CAS processor 290 determines whether the subscriber has chosen selection #3 "Deactivation" from the menu presented in step 809. If so, then the CAS processor 290 deactivates the service in step 860.

In step 863, the CAS processor 290 determines whether the subscriber has chosen selection #4 "Provisioning" from the menu presented in step 809. If so, then the CAS processor 290 executes the provisioning routines in step 866. An embodiment of provisioning using a browser on a thin client such as a cellular telephone is discussed in detail in FIG. 5 and FIG. 6.

After the call administration service has been activated in step 854, deactivated in step 860, or provisioned in step 866, the subscriber is given the option of exiting in step 871. If subscriber answers in the affirmative, the CAS processor 290 exits in step 878. If the subscriber answers in the negative, then the CAS processor 290 returns the subscriber to the menu presented at step 809.

The subscriber also has the option of quitting from the menu of step 809. If the CAS processor 290 determines that in step 873 the subscriber has chosen #5 "Quit" from the menu of step 809, the CAS processor 290 exits at step 878. If subscriber enters an invalid selection when presented with the menu of step 809 as determined in step 873, then the CAS processor 290 causes an "Invalid option" message to be presented and returns the subscriber to the menu at step 809.

Figure 9:
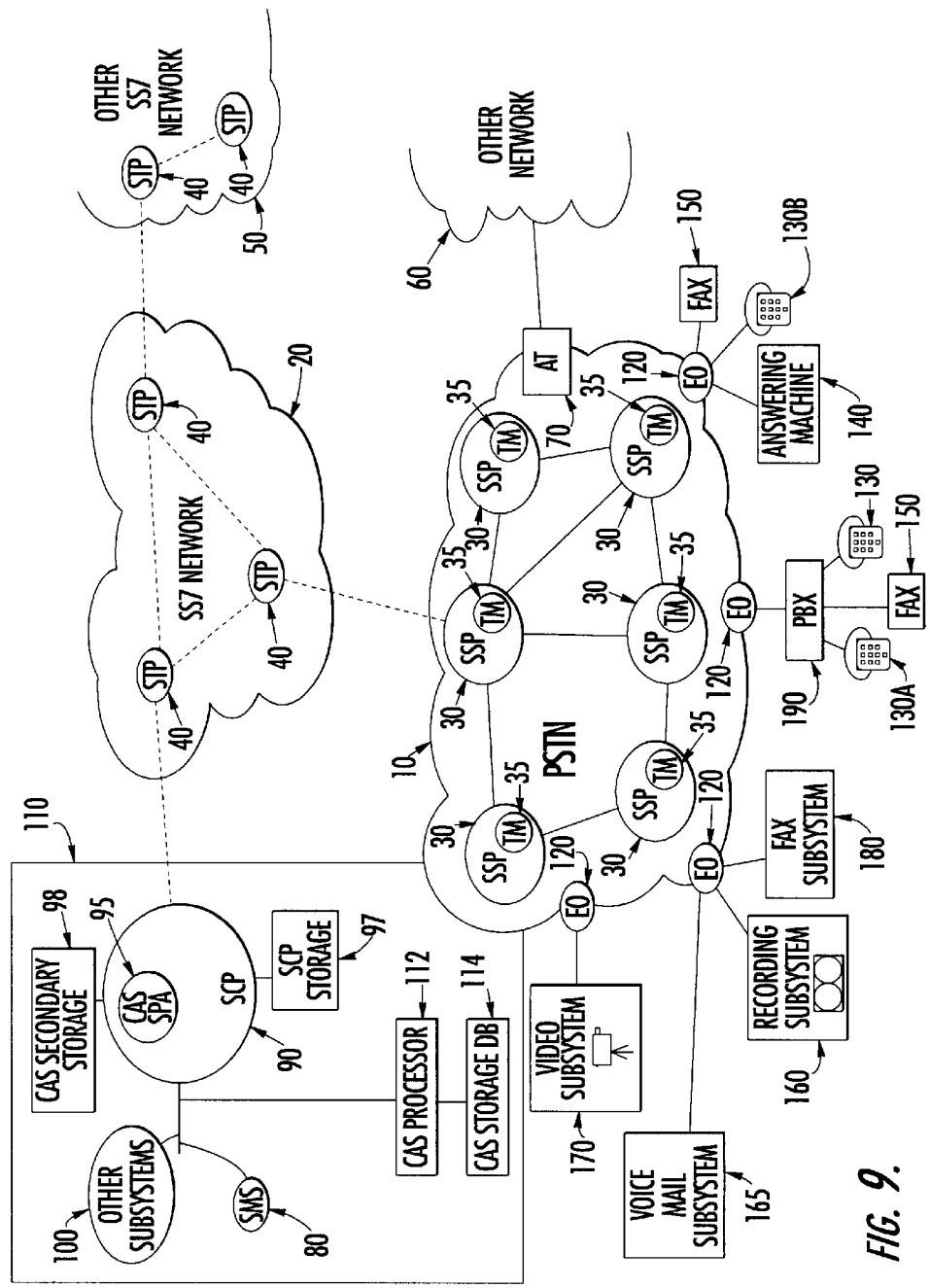
FIG. 9 comprises an embodiment of the present invention in a Public Switched Telephone Network environment.

FIG. 9 illustrates an embodiment of the present invention in the Public Switched Telephone Network (PSTN) 10 environment of a Regional Bell Operating Company (RBOC), such as BellSouth. The delivery of landline communications is accomplished via two major subsystems: the PSTN 10 and the Signaling System 7 (SS7) Network 20. The PSTN 10 transfers payload communications (voice and data) via switching nodes called Service Switching Points (SSP) 30. An SSP 30 may be a Lucent Technologies 5ESS® switch or other comparable switch. The SS7 network 20 is a packet switching network, which uses Signaling Transfer Point (STP) 40 elements to transfer SS7 messages used for management and control of the PSTN 10. SS7 network 20 may also interface to an Other SS7 Network 50, which predominantly carries packet switched data for controlling Other Network 60.

Another element of the PSTN 10 is the Access Tandem (AT) switch 70. An AT switch 70 may be a Lucent Technologies 5ESS g2000 switch or other comparable switch. The AT switch 70 is used to interface to other networks 60 and to consolidate 15 external communications traffic for transport via the PSTN 10. Other networks 60 include those of the same telephone technology, such as other RBOCs and long distance telephone companies. Other networks 60 also include networks of the different technologies, such as wireless (comprising the various cellular technologies, 3G, BLUETOOTH communication technology and PCS), ISDN (Integrated Services Digital Network), data networks, X.25, 20 Frame Relay, and ATM (Asynchronous Transfer Mode).

The local switching management center 110 is comprised of elements such as the Service Management System (SMS) 80, the Service Control Point (SCP) 90 and Other Subsystems 100. The SMS 80 manages software updates, service data updates, subscriber data updates and subscriber service reports. The SCP 90 is a server and an associated database, SCP storage 98. The SCP 90 interfaces with the SSP network element 30 via the SS7 network 20, and translates SSP 30 Transaction Capabilities Applications Protocol (TCAP) queries into routing instructions for the SSP 30. The local switching management center 110 also contains Other Subsystems 100 such as reporting and billing subsystems.

Additionally, the PSTN 10 interfaces to various types of user equipment and user subsystems via end office switches 120. User equipment includes telephones 130, 130A, and 130B, answering machines 140, and fax machines 150. User subsystems include recording 160, voice mail 165, video 170, fax 180 and Private Branch eXchanges (PBXs) 190 subsystems.

In one embodiment of the present invention, an SCP 90 hosts a Service Package Application (CAS SPA) 95 software subsystem. The CAS SPA 95 is a implements an embodiment of a method of the present invention. SCP storage 97 comprises persistent subscriber provisioning information. An alternative embodiment provides a CAS secondary storage 98 for storing caller administration service subscriber provisioning information.

In another embodiment of the present invention, a call administration service (CAS) processor 112 and a CAS storage database 114 are connected via a network connection (e.g., Ethernet, Fiber Distributed Data Interface, Asynchronous Transfer Mode, etc.) to the SMS 80 and SCP 90 network elements. The CAS processor 112 implements the methods of an embodiment of the present invention, while the CAS storage database 114 stores CAS subscriber provisioning information.

In a call flow scenario of the PSTN 10, an embodiment of a CAS SPA 95 implementation of the present invention proceeds as follows: A caller, using telephone 130A, dials a subscriber on telephone 130B. When the SSP 30 associated with subscriber telephone 130B detects a trigger associated with the incoming call, the SSP 30 associated with subscriber telephone 130B launches an AIN (Advanced Intelligent Network) query. An AIN query begins with a Transaction Capability Application Part (TCAP) query message that is sent via a Transactional Manager (TM) subsystem 35 within the SSP 30 to the SCP 90 by way of an STP 40 and the SS7 control network 20.

The STP 40 receives the TCAP query message, and then translates the subscriber's address to determine the correct SCP 90 address and the appropriate Service Package Application for processing the AIN service request. In this case, the CAS SPA 95 is the appropriate Service Application Package. The STP 40 reformulates and forwards the TCAP message to the appropriate SCP 90 over the SS7 network. The SCP 90 creates a routing key from the TCAP message and passes the routing key information along to the CAS SPA 95. The CAS SPA 95 uses the routing key to identify the subscriber of the call administration service (i.e., the called party).

Interaction between the CAS SPA 95 and the SSP 30 (with the STP 40 and SCP 90 as intermediaries) takes place throughout the implementation of the call administration service. For instance, during interactive routing, which is explained in the discussion of FIG. 12, an "unauthorized" caller (i.e., a caller who's identification information is not found in the current access list) has the option of entering a bypass code in order to be connected to the subscriber or entering an unauthorized caller routing option in order to be connected to a subscriber subsystem, such as a Recording Subsystem. The underlying implementation in this embodiment of the present invention comprises the CAS SPA 95 requesting that the SCP 90 send a TCAP conversation message by way of the STP 40 to the SSP 30. The purpose of this particular TCAP conversation message is to instruct the SSP 30 to present an announcement and to collect an unauthorized caller input. Upon receipt of the TCAP conversation message from the SCP 90, the SSP 30 presents an announcement and collects an unauthorized caller input. The SSP 30 then returns a conversation message containing the caller input, and the CAS SPA 95 proceeds with interactive routing processing based upon the contents of the conversation message returned by SSP 30.

Figure 10:
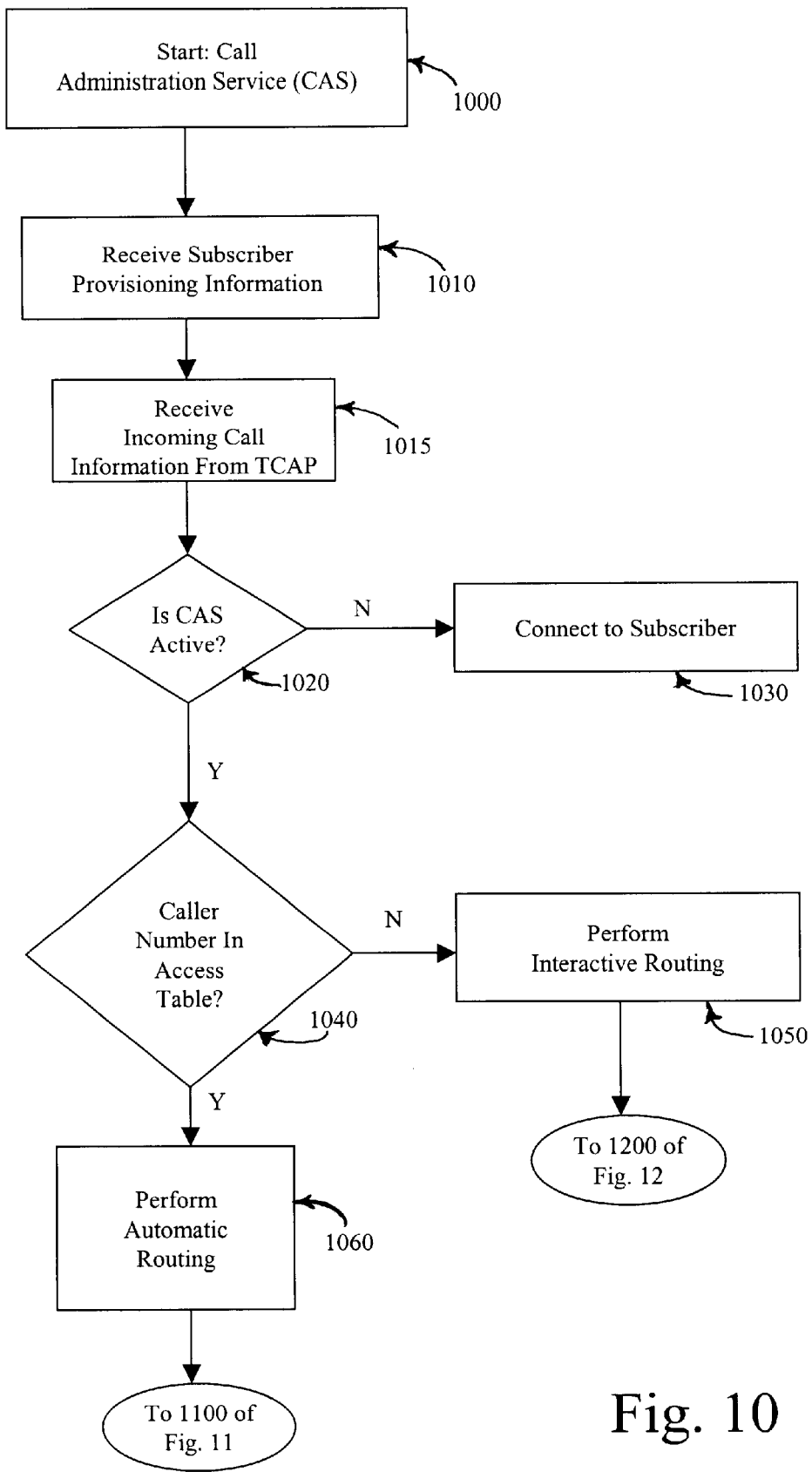
FIG. 10 comprises an overall flow diagram of an embodiment of the present invention in a public switched telephone network environment.
Figure 11:
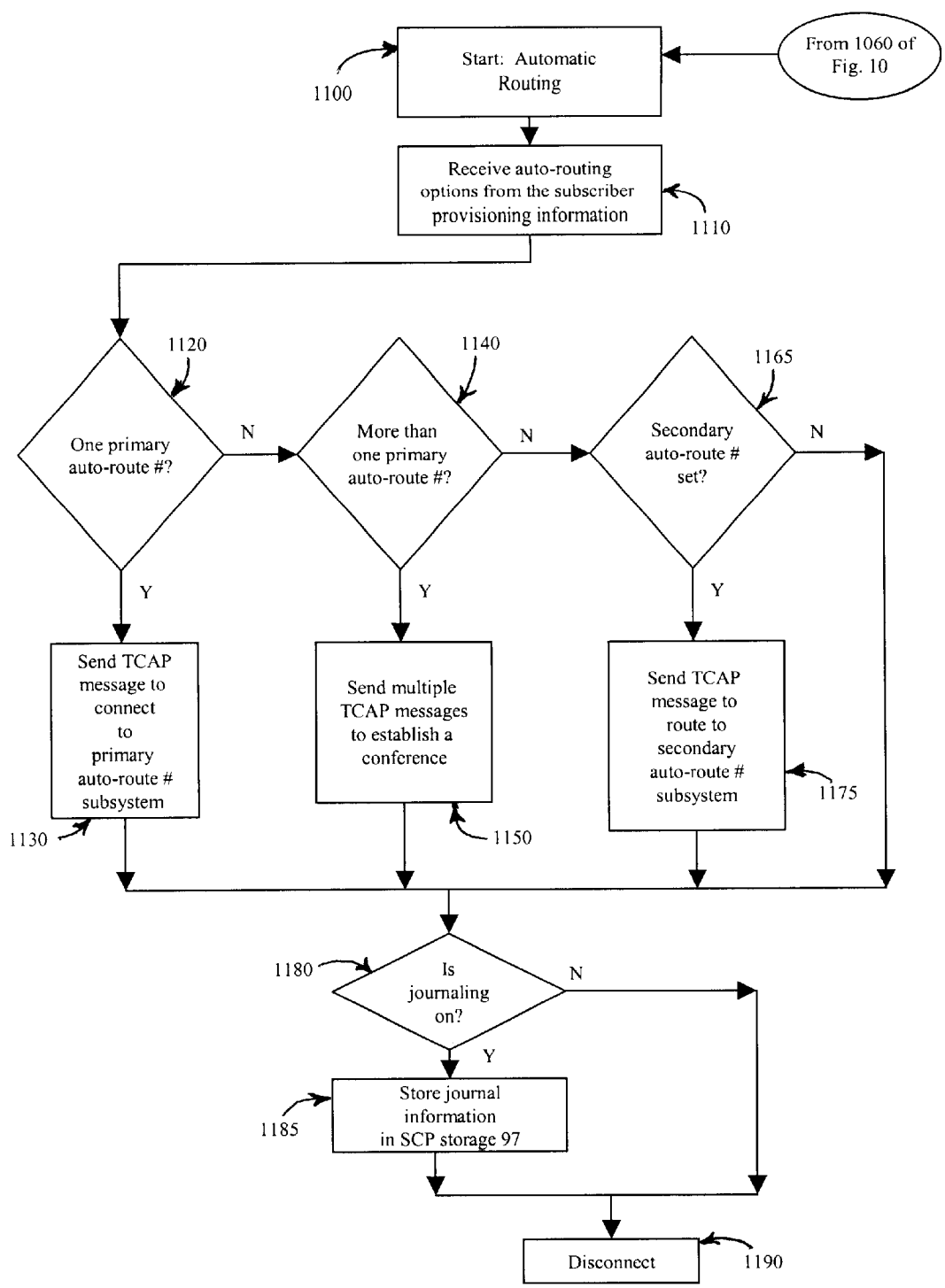
FIG. 11 comprises a flow chart of the automatic routing feature of an embodiment of the present invention in a public switched telephone network environment.
Figure 12:
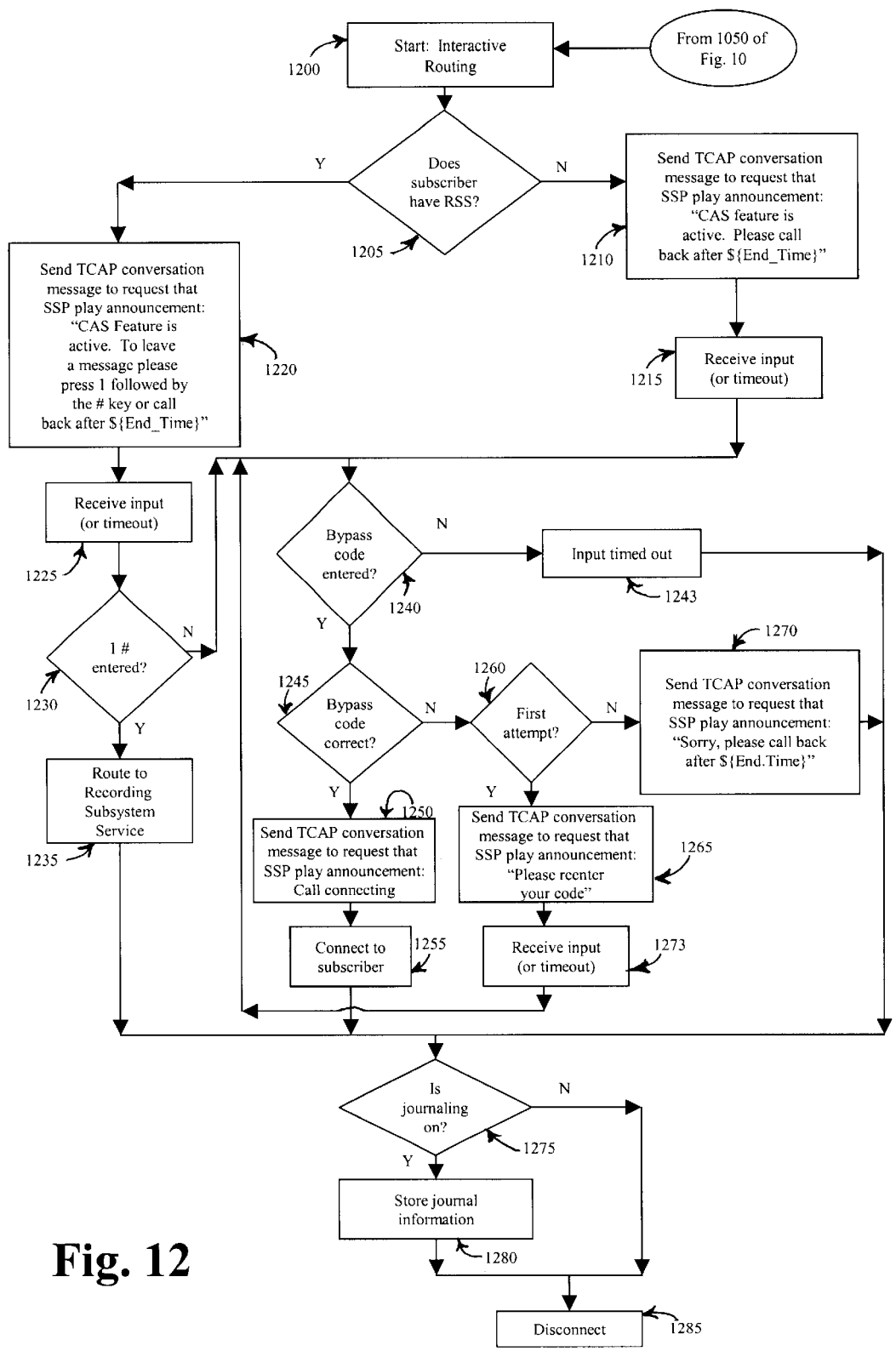
FIG. 12 comprises a flow chart of the interactive routing feature of an embodiment of the present invention in a public switched telephone network environment.

Such interaction takes place between a CAS SPA 95 and an SSP 30 when the CAS SPA 95 implements the call administration service. In order to not unnecessarily obscure the present invention, the well known process operations comprising the exchange of TCAP messages between a CAS SPA 95 and an SSP 30 in FIG. 10 through FIG. 12 are discussed from the perspective of the CAS SPA 95 only.

In the embodiment shown, before a subscriber's incoming calls are administered, the subscriber must initiate provisioning. Provisioning comprises using a data entry subsystem to set system configuration parameters in order to instruct the present invention as to how to process incoming calls. Typically, the subscriber provisions the system in real-time. However, alternate embodiments permit the subscriber to forward provisioning information to the CAS SPA 95 for storage and subsequent usage at a later time.

One embodiment of the present invention comprises a DTMF (Dual Tone Multiple Frequency) menu response system for data entry. Other embodiments provide for voice processing and speech processing data entry using, preferably, commercial off the shelf software as a software subsystem of the CAS SPA 95. Additionally, a browser form data entry mechanism for provisioning, and a formatted file translation data entry mechanism for provisioning are available as embodiments of the present invention. The browser form data entry mechanism may be implemented on a thin client device or a cellular phone in alternate embodiments. A formatted file is a file in which each field of the file is associated with a certain type of data. For instance, field 1 may comprise a subscriber's identification (comprising at least one of a name and a number), field 2 may comprise a file type identifier, field 3 may comprise a set of bypass codes, etc. A formatted file translation data entry mechanism comprises at least one of electronic delivery of a file with a standard internal format and hard copy delivery of a formatted file. Electronic delivery of a file further comprises at least one of email, a file transfer mechanism (such as File Transfer Protocol (FTP)), a diskette and a CD. Hard copy delivery further comprises a paper copy that is scanned for provisioning data in predefined fields.

After receiving provisioning information from the subscriber, CAS SPA 95 stores the provisioning information in SCP storage 97, which comprises secondary storage associated with the SCP 90. Alternatively, a separate secondary storage device, CAS secondary storage 98, used exclusively for the call administration service is provided in another embodiment of the present invention.

Once provisioned, the present invention must be activated to process incoming calls in accordance with the provisioning information. A subscriber invokes or activates the call administration service interactively, using one of the data entry mechanisms previously discussed in regards to subscriber provisioning.

To activate one embodiment the present invention, the subscriber sends to the CAS SPA 95 a system activator and activation times comprising at least one of an invocation point (or start time and/or date) and a termination point (or ending time and/or date). The present invention is activated by the CAS SPA 95 either immediately (if no invocation point or an immediate start time is sent by the operator to the CAS SPA 95) or at a later time specified by the invocation point. A flag is set to indicate activation status. System activators comprise at least one of a command, a script, a configuration file name and a pipeline. In one embodiment, optional times may be provided as direct input to the CAS SPA 95 in response to a menu driven series of questions (i.e., "Start the call administration at what time? [Hit # to start now]."). In another embodiment, optional times may be embedded within a configuration file, which the user submits to the CAS SPA 95.

After the present invention has been both provisioned and activated, the call administration service may then be implemented by the CAS SPA 95. FIG. 10 comprises an overall flow diagram of an embodiment of a method of the present invention, which is implemented by the CAS SPA 95 starting with step 1 000.

In step 1010, the CAS SPA 95 receives the subscriber provisioning information from SCP storage 97. In alternative embodiments, the CAS SPA 95 receives the subscriber provisioning information from CAS secondary storage 98, or the subscriber provisioning information is set directly by the subscriber in main memory as the current configuration. Next, in step 1015, the CAS SPA 95 receives incoming call information. Incoming call information comprises a caller identification, such as a caller number or caller name, extracted from the TCAP information.

At step 1020, the CAS SPA 95 determines if the subscriber has activated the call administration service. In one embodiment, the CAS SPA 95 implements this step by checking a flag, which indicates the call administration service activation status. If the system has not been activated, then in step 1030 the CAS SPA 95 communicates this inactive status to the SCP 90, which, in turn, instructs the SSP 30 via a TCAP message to connect the incoming call to the subscriber.

If the call administration service is active, the CAS SPA 95 will route the call in accordance with the subscriber provisioning information, which includes an access table. The CAS SPA 95 begins in step 1040 by searching a currently active access table for the caller identification, such as a caller number. In another embodiment, a caller identification comprises a caller name. If the caller identification is not found within the access table, then the CAS SPA 95 performs interactive routing in step 1050. Otherwise, the caller identification is found in the access table, and the CAS SPA 95 performs automatic routing in step 1060.

Step 1060 of FIG. 10 continues at step 1100 of FIG. 11. An embodiment of an automatic routing mechanism is shown in the flow chart of FIG. 11. The CAS SPA 95 starts executing the automatic routing routines at step 1100. In step 1110, the CAS SPA 95 receives auto-routing options from the subscriber provisioning information from the SCP storage 97.

At step 1120, the CAS SPA 95 determines if there is exactly one primary auto route number in the subscriber provisioning information (i.e., in the currently active access file associated with an authorized caller identification, where an authorized caller is a caller whose caller identification has been entered (i.e., provisioned) into an access table). If exactly one primary auto-route number associated with the authorized caller exists, then in step 1130 the CAS SPA 95 requests that the SCP 90 send a TCAP message 5 to the SSP 30 to connect the incoming call to the primary auto-route number subsystem. In one embodiment, an auto-route number of "O" indicates that the subsystem to which the incoming caller should be connected is the subscriber's home phone. Note that; subsystems comprise service provider systems (such as voice mail subsystems) and end user "systems" (such as home phones, cellular phones, BLUETOOTH communication devices, and PBXs).

If the CAS SPA 95 at step 1120 determines that there is not exactly one primary auto-route number associated with the authorized caller, then at step 1140 the CAS SPA 95 determines if there is more than one primary auto-route number associated with the caller identification within the access table.

If there is more than one primary auto-route number, then in step 1150 the CAS SPA 95 requests that the SCP 90 forward multiple TCAP messages (one per primary auto-route number, in one embodiment) to the SSP 30 to connect the incoming call to the auto-route numbers of subsystems in a multicast fashion. Such a mechanism would serve to establish an audio or video conference, for example.

If the CAS SPA 95 has determined that the subscriber has provisioned no primary auto-routes for the caller in the access list (i.e., the answers to the determinations made by the CAS SPA 95 in steps 1120 and 1140 are both "no"), then step 1165 is executed. In step 1165, the CAS SPA 95 determines whether a secondary auto-route number, associated with the authorized caller, exists in the access table. If a secondary auto-route number exists in the access table, then the CAS SPA 95 requests that the SCP 90 forward a TCAP message to the SSP 30 to connect the incoming call to the subsystem denoted by the secondary auto-route number. In this manner, a fail safe routing capability is implemented to connect an incoming call to a backup subsystem (i.e., the secondary subsystem).

Note that in one embodiment, the CAS SPA 95 determines whether subsystems are available. Routing of an incoming call takes place only if a subsystem is (or subsystems are) available. A subsystem is available if an incoming call can be connected to or terminated at the subsystem. Exemplary reasons a subsystem may be unavailable or unreachable include i) called party does not subscribe to a service implemented by that subsystem (i.e., VMS), ii) communications path is down, and iii) device (i.e., phone) is "off hook". CAS SPA 95 determines that a called party does not subscribe to a service by querying a subscriber service database. CAS SPA 95 determines that a communications path is down or that a device is off hook upon receipt of an appropriate TCAP message.

Next, the CAS SPA 95 executes step 1180 to determine if the subscriber has requested journaling. This step takes place after either the incoming call has been connected to a subsystem (in steps 1130, 1150 or 1175), if the requested secondary subsystem is determined by the CAS SPA 95 to be unavailable in step 1170, or if the CAS SPA 95 has determined that the secondary auto-route number is not set in step 1165.

If the subscriber has requested journaling, the CAS SPA 95 stores the requested journal information in SCP storage 97. Journaling is the logging of information about the incoming call. The logged information comprises at least one of a caller name, a caller number, a date/time stamp and the incoming call disposition (i.e., whether and where the incoming call was connected). An alternate embodiment comprises storing journal information in CAS secondary storage 98, which provides storage exclusively for the call administration service.

In another embodiment, stored journaling information may be formatted and viewed via a graphical user interface (GUI). Formatting includes HTML formatting. A subscriber may then subsequently view the HTML-formatted journaling information using a browser on a thin or thick client. In another embodiment, stored journaling information may be transferred electronically to another database for follow-on processing by a system such as the Personal Call Manager.

If the subscriber has not requested journaling, as determined by the CAS SPA 95 in step 1180, the incoming call is disconnected in step 1190. If the subscriber has requested journaling, then the CAS SPA 95 stores the journal information in step 1185, and the incoming call is then disconnected in step 1190. In an alternate embodiment, the incoming call disconnect step 1190 includes adding call duration to the stored journaling information.

Step 1050 of FIG. 10 continues at step 1200 of FIG. 12. An embodiment of an interactive routing mechanism is shown in the flow chart of FIG. 12. The CAS SPA 95 starts the interactive routing methods at step 1200. For this particular embodiment, in step 1205, the CAS SPA 95 determines whether the subscriber has a Recording Subsystem Service (RSS).

If the subscriber dose not subscribe to RSS, then the CAS SPA 95 in step 1210 initiates a message, requesting that the SCP 90 send a TCAP conversation message to 5 SSP 30 requesting that an ammouncement be presented by the SSP 30 and that SSP 30 collect a bypass code from the caller, if the coller enter such a bypass code. In one embodiment, the ammouncement presented in step 1210 tells the caller that the call administration service is active and that the caller should call back after the service activation time ends. In another embodiment, announcement may be "displayed". Note 10 that an audio announcement is "displayed" by playing the announcement. A video or visual announcement (or text display announcement) is displayed by displaying the announcement on a display screen (of a thin client device, for example). Additionally, an announcement comprises at least one of an announcement and a menu. Also, example of thin client device include, but are not limited to, cellular phones, hand held computers, 15 PALM device, and BLUETOOTH communication device.

At this point, the caller has a time-limited option to enter a bypass code in step 1215. The entered bypass code will be received or captured by the CAS SPA 95 by way of the SCP 90 via the return TCAP conversation message from the SSP 30. Should the caller not enter an option in a timely manner, the CAS SPA 95 times out and sets the caller input to NULL.

If the subscriber does subscribe to RSS, then the CAS SPA 95 in step 1220 initiates a message, requesting that the SCP 90 send a TCAP conversation message to SSP 30 requesting that an announcement be presented by the SSP 30 and that SSP 30 collect input from the caller, if the caller enters such input. Valid input comprises at least one of a menu option that indicates a caller-selected subsystem to which the incoming call is being requested to be routed, and a bypass code. The CAS SPA 95 receives or captures the caller input in step 1225 by way of the SCP 90 via the return TCAP conversation message from the SSP 30. Again, should the caller not enter input in a timely manner, the CAS SPA 95 times out and sets the caller input to NULL.

In one embodiment, the caller has an option of entering "1#" to invoke the RSS service. Note that other embodiments provide additional subscriber subsystems (beyond just a RSS service) which an unauthorized caller (i.e., a caller who is not in the access table for auto-routing) may chose by entering the correct number (presented in the announcement), or the caller may be given the option of entering only a "#" symbol to escape (and disconnect). In such an embodiment, the CAS SPA 95 routes the incoming call to the subsystem associated with the caller-entered unauthorized caller route option. For instance, menu options may be presented to the caller for connecting to a RSS ("1#"), a fax subsystem ("2#") or a mobile phone ("3#"), and the incoming call is then routed according to the caller's menu selection.

Note that unauthorized caller route options are provisioned by the subscriber.

In step 1230, the CAS SPA 95 determines whether "1#" has been entered by the caller. If so, the CAS SPA 95 enables routing of the incoming call to the RSS in step 1235. The actual routing takes place using the TCAP mechanism and the SCP 90 and SSP 30 network elements, as previously described for automatic routing in the discussion of FIG. 11.

If "1#" has not been entered by the caller, the CAS SPA 95 determines whether a bypass code has been entered in step 1240, and checks the validity of the bypass code in step 1245. The validity check is performed by the CAS SPA 95 by comparing the caller-entered bypass code to an at least one bypass code stored in SCP storage 97 as subscriber provisioning information. Various embodiments of the call administration service include a data entry mechanism for the menu selection and the bypass code of at least one of DTMF, voice and speech input, where voice input is speaker specific, but speech input is not speaker specific. Both voice and speech recognition processing may be implemented by commercial off the shelf voice and speech recognition software integrated as a software subsystem of the CAS SPA 95. If the correct bypass code has been entered by the caller, then in step 1250 the CAS SPA 95 presents an announcement that the call is connecting, and the incoming call is connected to the subscriber in step 1255.

If no bypass code is entered in step 1240, then the CAS SPA 95 times out in step 1243. The incoming call will ultimately not be connected at this point.

If an invalid bypass code is detected by the CAS SPA 95 in step 1245, then the CAS SPA 95 determines if this is the caller's first attempt at entering a bypass code. If the caller has already entered one incorrect bypass code, as determined by the CAS SPA 95 in step 1260, then the CAS SPA 95 presents an announcement at step 1270, instructing the caller to call back at a later time. In one embodiment, the later call back time can be specified as the time when the caller administration service is scheduled to deactivate.

If the caller has only tried once to enter the correct bypass code (as determined by the CAS SPA 95 in step 1260), the caller is given a second chance to enter the correct bypass code. First, the CAS SPA 95 requests that an announcement be presented in step 1265, which instructs the caller to reenter the bypass code. Then the CAS SPA 95 receives the caller's input (or times out) in step 1273. Processing then returns to step 1240, where the CAS SPA 95 determines whether a bypass code entry exists.

After the CAS SPA 95 executes one of steps 1235 or 1255 (and connects the incoming call to a subsystem or to the subscriber), or executes one of steps 1243 or 1270 (and fails to connect the incoming call), then CAS SPA 95 determines whether the subscriber has requested journaling in step 1275. If the subscriber has requested journaling, as determined by the CAS SPA 95 in step 1275 (by determining whether a journaling semaphore has been set), then the requested journal information is stored in SPC storage 97, or alternatively in CAS secondary storage 98, at step 1280.

In one embodiment, stored journaling information may be formatted and viewed via a graphical user interface (GUI). Formatting includes HTML formatting. A subscriber may then subsequently view the HTML-formatted journaling information using a browser on a thin or thick client. In another embodiment, stored journaling information may be transferred electronically to another database for follow-on processing by a system such as a Personal Call Manager.

The incoming call is disconnected at step 1285 after the CAS SPA 95 executes step 1280 (and stores journal information) or after the CAS SPA 95 executes step 1275 (and determines that journaling is not requested). In another embodiment, the incoming call disconnect step 1285 includes adding call duration to the stored journaling information.

Various embodiments of the present invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention.

What is claimed is:

1. A method for implementing call management comprising:

receiving an incoming call from a caller;
receiving incoming call information (ICI), wherein ICI comprises a caller identification (CI);
extracting the CI from the ICI;
receiving subscriber provisioning information (SPI); and
routing the incoming call in accordance with the SPI, wherein routing the incoming call comprises at least one of;
interactive routing, wherein interactive routing comprises:
displaying an announcement to the caller;
receiving optional input from the caller; and
routing the incoming call in accordance with the optional caller input of the caller; and
automatic routing, wherein automatic routing comprises:
receiving an access table from the SPI;
validating the caller as an authorized caller in the access table in accordance with the CI;
receiving from the access table an at least one auto-route option associated with the authorized caller; and
connecting the incoming call in accordance with the at least one auto-route option associated with the authorized caller.

2. The method of claim 1, wherein receiving subscribe provisioning information comprises:

establishing an interface to a data entry subsystem;
receiving the SPI from the data entry subsystem; and
storing the SPI.

3. A method for implementing call management comprising:

receiving an incoming call from a caller;
receiving incoming call information (ICI), wherein the ICI comprises a caller identification (CI);
extracting the CI from the ICI;
receiving subscriber provisioning information (SPI), wherein receiving subscriber provisioning information (SPI) comprises:
establishing an interface to a browser implemented oil a client device;
receiving the SPI through the browser of the client device; and
storing the SPI; and
routing the incoming call in accordance with the SPI, wherein routing the incoming call comprises at least one of:
interactive routing; and
automatic routing, wherein automatic routing comprises:
receiving an access table from the SPI;
validating the caller as an authorized caller in the access table in accordance with the CI;
receiving from the access table an at least one auto-route option associated with the authorized caller; and
connecting the incoming call in accordance with the at least one auto-route option associated with the authorized caller.

4. The method of claim 1, wherein receiving subscriber provisioning information (SPI) comprises:

establishing an interface to a browser implemented on a cellular phone;
receiving the SPI through the browser; and
storing the SPI.

5. The method of claim 1, wherein the optional caller input comprises at least one of:

a bypass code;
a bypass route option; and
an unauthorized caller route option.

6. The method of claim 1, wherein the optional caller input comprises a spoken bypass code.

7. A method for implementing call management comprising:
receiving an incoming call from a caller;
receiving incoming call information (ICI), wherein the ICI comprises a caller identification (CI);
extracting the CI from the ICI;
receiving subscriber provisioning information (SPI); and
routing the incoming call in accordance with the SPI, wherein routing the
incoming call comprises at least one of:
interactive routing; and
automatic routing, wherein automatic routing comprises:
receiving an access table from the SPI;
validating the caller as an authorized caller in the access table in accordance with the CI;
receiving from the access table an at least one auto-route option associated with the authorized caller; and
connecting the incoming call in accordance with the at least one auto-route option associated with the authorized caller, wherein the at least one auto-route option associated with the authorized caller comprises at least two auto-route options for establishing a multicast route.

8. The method of claim 1, wherein receiving subscriber provisioning information (SPI) includes receiving the subscriber provisioning information having at least one secondary auto-route option.

9. A system for implementing call management, comprising:
an incoming call receiver capable of receiving an incoming call from a caller;
an incoming call information (ICI) receiver capable of receiving ICI, wherein the ICI comprises a caller identification (CI);
a CI extractor capable of extracting the CI from the ICI;
a subscriber provisioning information (SPI) receiver capable of receiving SPI; and
an incoming call router, comprising at least one of:
an internative router, wherein the interactive router comprises:
a display for communication an announcement to the caller;
an input receiver capable of capturing input; and
a connecting router capable of connecting the incoming call in accordance with the captured input; and
an automatic router, wherein the automatic router comprises:
an access table receiver capable of receiving an access table from the SPI;
an authorized caller validator capable of validating the caller as authorized in the access table in accordance with the CI;
an auto-route option receiver capable of receiving at least one auto-route option associated with the authorized caller from the access table; and
an incoming call terminator capable of termination the incoming call in accordance with the at least one auto-route option associated with authorized caller from the access table.

10. A system for implementing call management, comprising:
an incoming call receiver capable of receiving an incoming call from a caller;
an incoming call information (ICI) receiver capable of receiving ICI, wherein the ICI comprises a caller identification (CI);
a CI extractor capable of extracting the CI from the ICI;
a subscriber provisioning information (SPI) receiver capable of receiving SPI,
wherein the SPI receiver receives the SPI interfacing a browser implemented on a client device; and
an incoming call router, comprising at least one of:
an interactive router; and
an automatic router, wherein the automatic router comprises:
an access table receiver capable of receiving an access table from the SPI;
an authorized caller validator capable of validating the caller as authorized in the access table in accordance with the CI;
an auto-route option receiver capable of receiving at least one auto-route option associated with the authorized caller from the access table; and
an incoming call terminator capable of terminating the incoming call in accordance with the at least one auto-route option associated with the authorized caller from the access table.

11. The system of claim 10, wherein the client device comprises a caller phone a PALM device, a hand held computer or a Bluetooth device.

12. The system of claim 9, wherein the captured input comprises at least one of:
a bypass code;
a bypass route option; and
an unauthorized caller route option.

13. The system of claim 12, wherein the bypass code comprises a spoken bypass code.

14. A system for implementing call management, comprising:
an incoming call receiver capable of receiving an incoming call from a caller;
an incoming call information (ICI) receiver capable of receiving ICI, wherein the ICI comprises a caller identification (CI);
a CI extractor capable of extracting the CI from the ICI;
a subscriber provisioning information (SPI) receiver capable of receiving SPI; and
an incoming call router, comprising at least one of:
an incoming call router; and
an automatic router, wherein the automatic router comprises:
an access table receiver capable of receiving an access table from the SPI;
an authorized caller validator capable of validating the caller as authorized in the access table in accordance with the CI;
an auto-route option receiver capable of receiving at least one auto-route option associated with the authorized caller from the access table; and
an incoming call terminator capable of terminating the incoming call in accordance with the at least one auto-route option associated with the authorized caller from the access table, wherein the at least one auto-route option associated with the authorized caller comprises at least two auto-route option, for establishing a multicast route.

15. The system of claim 9, wherein the at least one auto-route option associated with the authorized caller from the access table further comprises at least one secondary auto route option.

16. A system for implementing call management comprising:
an incoming call receiver capable of receiving an incoming call from a caller;
an incoming call information (ICI) receiver capable of receiving ICI, wherein the ICI comprises a caller identification (IC);
a CI extractor capable of extracting the CI from the ICI;
a subscriber provisioning information (SPI) receiver capable of receiving SPI;
and an incoming call router, comprising at least one of:
an interactive router; and
an automatic router, wherein the automatic router comprises:
an access table receiver capable of receiving an access table from the SPI;
an authorized caller validator capable of validating the caller as authorized in the access table in accordance with the CI;
an auto-route option receiver capable of receiving at least one auto-route option associated with the authorized caller from the access table; and
an incoming call terminator capable of terminating the incoming call in accordance with the at least one auto-route option associated with the authorized caller from the access table, wherein the interactive router comprises:
a display for communicating an announcement to the caller;
an input receiver capable of capturing input; and
a connecting router capable of connecting the incoming call in accordance with the captured input.

17. The system of claim 16, wherein the at least one auto-route option associated with; the authorized caller from the access table further comprises at least one secondary auto route option.

18. A method for implementing call management comprising:
receiving a incoming call from a caller;
receiving incoming call information (ICI), wherein the ICI comprises a caller identification (CI);
extracting the CI from ICI;
receiving subscriber provisioning information (SPI), wherein receiving subscriber provisioning information comprises:
establishing an interface to a data entry subsystem;
receiving the SPI from the data entry subsystem; and
storing the SPI; and
routing the incoming call in accordance with the SPI, wherein routing the incoming call comprises at least one of:
interactive routing; and
automatic routing, wherein automatic routing comprises:
receiving an access table from the SPI;
validating the caller as an authorized caller in the access table in accordance with the CI;
receiving from the access table an at least one auto-route option associated with the authorized caller; and
connecting the incoming call in accordance with at least one auto-route option associated with the authorized caller.

19. A method for implementing call management comprising:
receiving a incoming call from a caller;
receiving incoming call information (ICI), wherein the ICI comprises a caller identification (CI);
extracting the CI from ICI;
receiving subscriber provisioning information (SPI), wherein receiving subscriber provisioning information (SPI) comprises:
establishing an interface to a browser implemented on a client device;
receiving the SPI from the browser of the client device; and
storing the SPI; and
routing the incoming call in accordance with the SPI, wherein routing the incoming call comprises at least one of:
interactive routing; and
automatic routing, wherein automatic routing comprises:
receiving an access table from the SPI;
validating the caller as an authorized caller in the access table in accordance with the CI;
receiving from the access table an at least one auto-route option associated with the authorized caller; and
connecting the incoming call in accordance with at least one auto-route option associated with the authorized caller.

20. A method for implementing call management comprising:
receiving an incoming call from a caller;
receiving incoming call information (ICI), wherein the ICI comprises a caller identification (CI);
extracting the CI from the ICI;
receiving subscriber provisioning information (SPI); and
routing the incoming call in accordance with the SPI, wherein routing the incoming call comprises at least one of:
interactive routing; and
automatic routing, wherein automatic routing comprises:
receiving an access table from the SPI;
validating the caller as an authorized caller in the access table in accordance with the CI;
receiving from the access table an at least one auto-route option associated with the authorized caller; and
connecting the incoming call in accordance with the least one auto-route option associated with the authorized caller,
wherein interactive routing comprises:
displaying an announcement to the caller;
receiving the optional input from the caller; and
routing the incoming call in accordance with the optional caller input.

21. The system of claim 16 wherein call management is performed in a wireless environment.

22. The system of claim 16 wherein call management is performed in a public switched telephone network.

23. A system for implementing call management, comprising:
an incoming call receiver capable of receiving an incoming call from a caller;
an incoming call information (ICI) receiver capable of receiving ICI, wherein the ICI comprises a caller identification (CI);
a CI extractor capable of extracting the CI from the ICI;
a subscriber provisioning information (SPI) receiver capable of receiving SPI;
and an incoming call router, comprising at least one of:
an interactive router; and
an automatic router, wherein automatic router comprises:
an access table receiver capable of receiving an access table from the SPI;
an authorized caller validator capable of validating the caller as authorized in the access table in accordance with the CI;
an auto-route option receiver capable of receiving at least one auto-route option associated with the authorized caller from the access table; and
an incoming call terminator capable of terminating the incoming call in accordance with the at least one auto-route option associated with the authorized caller from the access table, wherein the at least one auto-route option associated with the authorized caller comprises at least two auto-route option for establishing a multicast route.

24. A system for implementing call management, comprising:
an incoming call receiver capable of receiving an incoming call from a caller;
an incoming call information (ICI) receiver capable of receiving ICI, wherein the ICI comprises a caller identification (CI);
a CI extractor capable of extracting the CI from the ICI;
a subscriber provisioning information (SPI) receiver capable of receiving SPI; and
and an incoming call router, comprising at least one of:
an incoming call router; and
an automatic router, wherein the automatic router comprises:
an access table receiver capable of receiving an access table from the SPI;
an authorized caller validator capable of validating the caller as authorized in the access table in accordance with the CI;
an auto-route option receiver capable of receiving at least one auto-route option associated with the authorized caller from the access table; and
an incoming call terminator capable of terminating the incoming call in accordance with the at least one auto-route option associated with the authorized caller from the access table, wherein the at least one auto-route option associated with the authorized caller from the access table further comprises at least one secondary auto-route option.

25. The method of claim 18 wherein call management is performed in a wireless environment.

26. The method of claim 18 wherein call management is performed in a public switched telephone environment.

27. A method for implementing call management comprising:
receiving an incoming call from a caller;
receiving incoming call information (ICI), wherein the ICI comprises a caller identification (CI);
extracting the CI from the ICI;
receiving subscriber provisioning information (SPI); and
routing the incoming call in accordance with the SPI, wherein routing the incoming call comprises at least one of:
interactive routing; and
automatic routing, wherein automatic routing comprises:
receiving an access table from the SPI;
validating the caller as an authorized caller in the access table in accordance with the CI;
receiving from the access table an at least one auto-route option associated with the authorized caller; and
connecting the incoming call in accordance with at least one auto-route option associated with the authorized caller, wherein the at least one auto-route option associated with the authorized caller comprises at least two auto-route options for establishing a multicast route.

28. The method of claim 18, wherein receiving subscriber provisioning information (SPI) includes receiving the subscriber provisioning information having at least one secondary auto-route option.

* * * * *